United States Patent
Mori et al.

(10) Patent No.: US 10,829,034 B2
(45) Date of Patent: Nov. 10, 2020

(54) VEHICLE CONTROL DEVICE

(71) Applicant: AISIN SEIKI KABUSHIKI KAISHA, Kariya-shi (JP)

(72) Inventors: Kazuya Mori, Fukutsu (JP); Toshifumi Haishi, Munakata (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/258,717

(22) Filed: Jan. 28, 2019

(65) Prior Publication Data

US 2019/0299847 A1    Oct. 3, 2019

(30) Foreign Application Priority Data

Mar. 29, 2018  (JP) ................ 2018-063572
Nov. 8, 2018   (JP) ................ 2018-210828

(51) Int. Cl.
*B60Q 1/22* (2006.01)
*B60Q 1/24* (2006.01)
*E05F 15/73* (2015.01)

(52) U.S. Cl.
CPC ............. *B60Q 1/24* (2013.01); *E05F 15/73* (2015.01); *B60Q 2400/50* (2013.01); *E05F 2015/767* (2015.01); *E05Y 2900/531* (2013.01)

(58) Field of Classification Search
CPC ....... B60Q 1/24; B60Q 2400/50; E05F 15/73; E05F 2015/767; E05Y 2900/531
See application file for complete search history.

(56) References Cited

U.S. PATENT DOCUMENTS

| | | | |
|---|---|---|---|
| 2010/0295670 A1* | 11/2010 | Sato | B60Q 9/00 340/458 |
| 2016/0001700 A1* | 1/2016 | Salter | F21S 43/145 362/510 |
| 2016/0186480 A1* | 6/2016 | Krauss | B60R 25/2054 701/49 |
| 2017/0113652 A1 | 4/2017 | Tokudome | |
| 2017/0152697 A1* | 6/2017 | Dehelean | G07C 9/00309 |
| 2017/0203685 A1 | 7/2017 | Hirai et al. | |
| 2017/0259734 A1 | 9/2017 | Imaishi et al. | |
| 2017/0267167 A1 | 9/2017 | Sakata et al. | |
| 2018/0361992 A1* | 12/2018 | Takagi | B60Q 1/323 |

FOREIGN PATENT DOCUMENTS

| | | |
|---|---|---|
| JP | 2005-199824 | 7/2005 |
| JP | WO 2016/027312 A1 | 2/2016 |
| JP | WO 2016/027314 A1 | 2/2016 |
| JP | 2016-035191 | 3/2016 |
| JP | 2016-035192 | 3/2016 |
| JP | 2016-035193 | 3/2016 |

(Continued)

*Primary Examiner* — Phung Nguyen
(74) *Attorney, Agent, or Firm* — Oblon, McClelland, Maier & Neustadt, L.L.P.

(57) ABSTRACT

A vehicle control device includes: an irradiation device that is disposed in a vehicle, and that irradiates a road surface with light so as to draw a determination area on the road surface; an action determination unit that determines an action of a user existing in the determination area; and a vehicle control unit that controls the vehicle, based on the action of the user which is determined by the action determination unit.

15 Claims, 12 Drawing Sheets

(56) References Cited

FOREIGN PATENT DOCUMENTS

| | | |
|---|---|---|
| JP | 2016-035194 | 3/2016 |
| JP | 2016-035195 | 3/2016 |
| JP | 2016-102315 | 6/2016 |
| JP | 2016-532794 | 10/2016 |
| JP | 2017-082390 | 5/2017 |
| JP | 2017-518447 | 7/2017 |
| JP | 2017-218783 | 12/2017 |
| WO | WO 2016/027315 A1 | 2/2016 |

* cited by examiner

VEHICLE CONTROL DEVICE

CROSS REFERENCE TO RELATED APPLICATIONS

This application is based on and claims priority under 35 U.S.C. § 119 to Japanese Patent Applications 2018-063572 and 2018-210828, filed on Mar. 29, 2018 and Nov. 8, 2018, respectively, the entire contents of which are incorporated herein by reference.

TECHNICAL FIELD

An embodiment of this disclosure relates to a vehicle control device.

BACKGROUND DISCUSSION

In the related art, a technique of a vehicle control device is known as follows. The vehicle control device uses one lighting device for irradiating an exterior of a vehicle with light. In this manner, the vehicle control device illuminates feet of an occupant when the occupant gets on and off the vehicle, and visually notifies a user of a locked state or an unlocked state.

JP 2005-199824A (Reference 1) is an example of the related art.

However, the related art is nothing but a technique for notifying the user of a state of the vehicle, and does not consider a technique which enables the user to communicate an intention of the user to the vehicle.

Thus, a need exists for a vehicle control device which is not susceptible to the drawback mentioned above.

SUMMARY

As an example, a vehicle control device according to an embodiment includes an irradiation device that is disposed in a vehicle, and that irradiates a road surface with light so as to draw a determination area on the road surface, an action determination unit that determines an action of a user existing in the determination area, and a vehicle control unit that controls the vehicle, based on the action of the user which is determined by the action determination unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
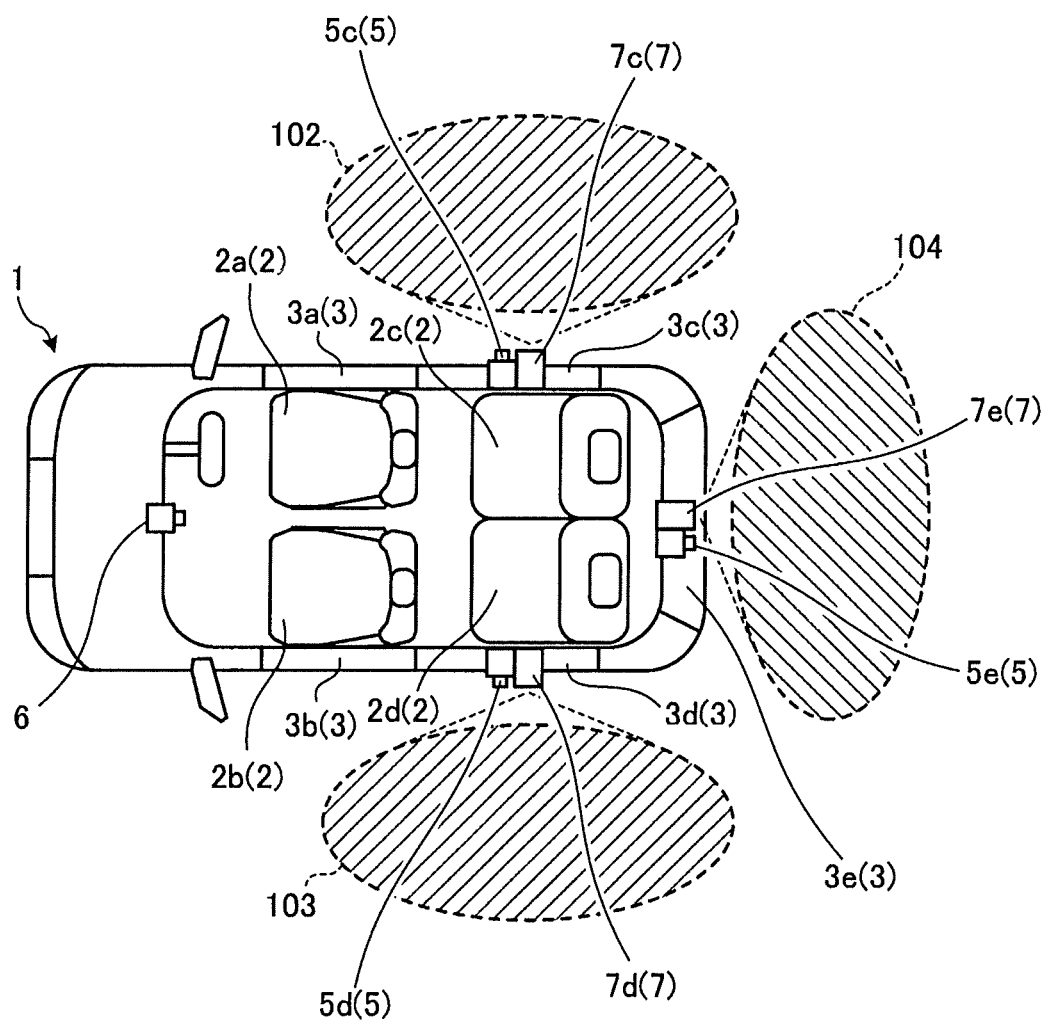
FIG. 1 is a plan view when a vehicle interior of a vehicle to which a vehicle control device according to an embodiment disclosed here is applied is viewed from above.

FIG. 1 is a plan view when a vehicle interior of a vehicle to which a vehicle control device according to an embodiment disclosed here is applied is viewed from above.

A vehicle 1 may be an automobile (internal combustion engine automobile) using an internal combustion engine (engine) as a drive source, or an automobile (electric automobile or fuel cell automobile) using an electric motor (motor) as a drive source. Alternatively, the vehicle 1 may be an automobile (hybrid automobile) using both of these as a drive source. In addition, the vehicle 1 can be equipped with various transmission devices or various devices (systems or components) needed to drive the internal combustion engine or the electric motor. In addition, a type, the number, or a layout of the devices relating to wheel driving in the vehicle 1 can be set in various ways.

As illustrated in FIG. 1, the vehicle interior of the vehicle 1 has a plurality of seats 2. Specifically, a driver seat 2a and a front passenger seat 2b are disposed on a front side of the vehicle interior, and a plurality of (herein, two) rear seats 2c and 2d are disposed on a rear side of the vehicle interior. The rear seat 2c is disposed behind the driver seat 2a, and the rear seat 2d is disposed behind the front passenger seat 2b.

In addition, the vehicle 1 has a plurality of doors 3. Specifically, a door 3a is disposed on a right side of the driver seat 2a, a door 3b is disposed on a left side of the front passenger seat 2b, a door 3c is disposed on a right side of the rear seat 2c, and a door 3d is disposed on a left side of the rear seat 2d. Among the doors 3a to 3d, the door 3c and the door 3d are electric doors such as power sliding doors, for example. In addition, the door 3e is disposed in a rear part of the vehicle 1. The door 3e is a hatch-type electric door (power backdoor) which is open and closed upward and downward.

In addition, the vehicle 1 has a plurality of vehicle exterior cameras 5 for imaging a vehicle exterior. Specifically, a vehicle exterior camera 5c is disposed on the right side of the rear seat 2c, and a vehicle exterior camera 5d is disposed on the left side of the rear seat 2d. The vehicle exterior camera 5c images the right side of the vehicle 1, and the vehicle exterior camera 5d images the left side of the vehicle 1. In addition, the vehicle exterior camera 5e is disposed in the rear part of the vehicle 1. The vehicle exterior camera 5e images a rear side of the vehicle 1. The vehicle exterior cameras 5c to 5e are charge coupled device (CCD) cameras.

In addition, the vehicle 1 has an in-vehicle camera 6 which images the vehicle interior. The in-vehicle camera 6 is the CCD camera, for example. The in-vehicle camera 6 is designed so as to be capable of imaging all of the seats 2a to 2d of the vehicle interior. In other words, a field angle and an installation position of the in-vehicle camera 6 are determined so as to be capable of imaging all occupants sitting on the seats 2a to 2d. For example, the in-vehicle camera 6 is installed around a room mirror.

In addition, the vehicle 1 has a plurality of irradiation devices 7. The irradiation device 7 is a projector, a light-emitting diode (LED) light, or a laser light, for example. The irradiation device 7 draws a predetermined drawing pattern around the vehicle 1 by irradiating a road surface with light. Specifically, an irradiation device 7c is disposed on the right side of the rear seat 2c, and the irradiation device 7d is disposed on the left side of the rear seat 2d. In addition, an irradiation device 7e is disposed in the rear part of the vehicle 1. The irradiation device 7c draws a drawing pattern on the road surface inside an irradiation-available region 102 located on the right side of the vehicle 1. The irradiation device 7d draws a drawing pattern on the road surface inside an irradiation-available region 103 located on the left side of the vehicle 1. The irradiation device 7e draws a drawing pattern on the road surface inside an irradiation-available region 104 located behind the vehicle 1.

Figure 2:
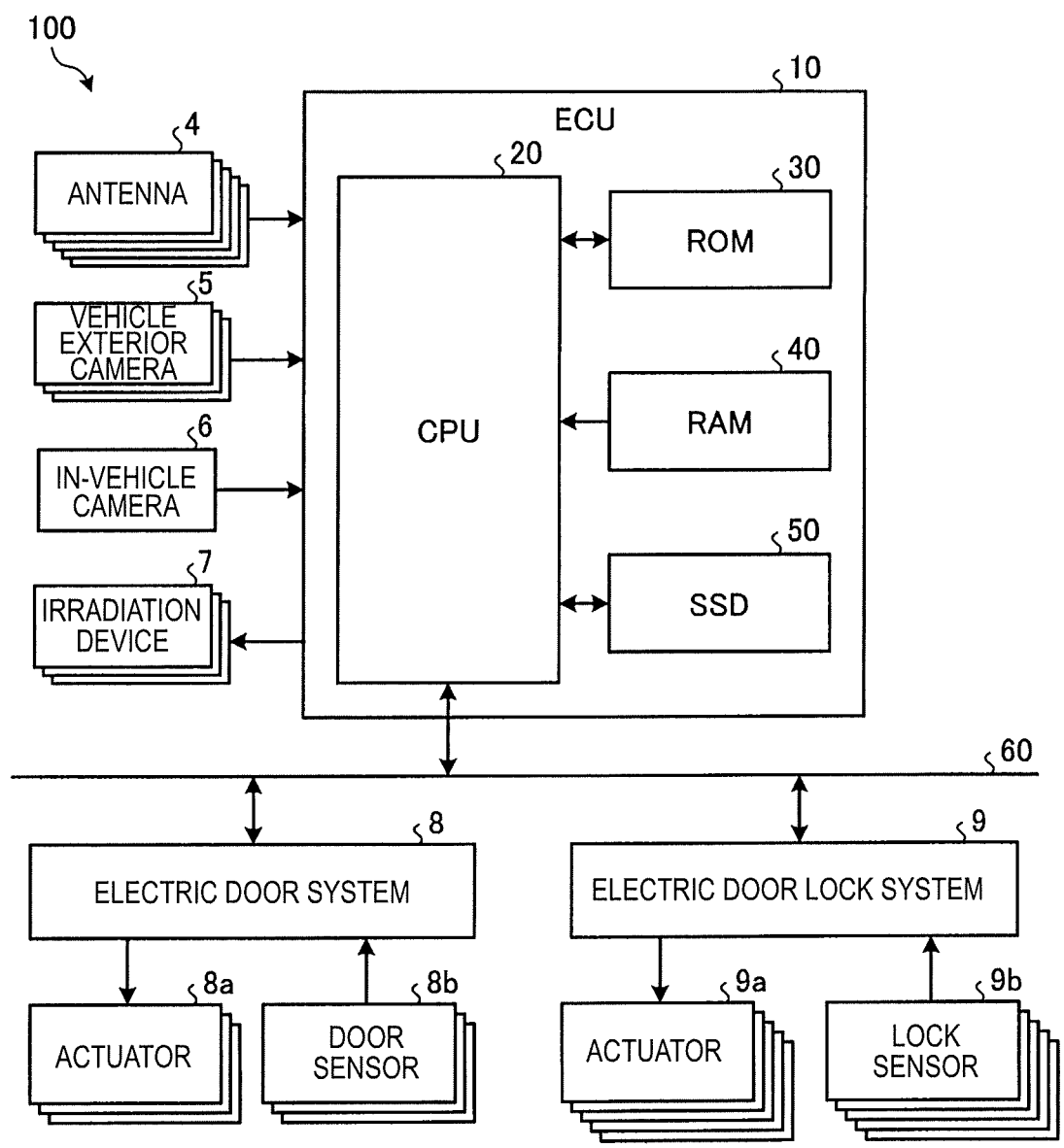
FIG. 2 is a block diagram illustrating a configuration of a control system according to the embodiment.

The vehicle 1 has a control system including a vehicle control device according to the embodiment disclosed here. A configuration of the control system will be described with reference to FIG. 2. FIG. 2 is a block diagram illustrating the configuration of the control system according to the embodiment.

As illustrated in FIG. 2, in the control system 100, in addition to an electronic control unit (ECU) 10, for example, an electric door system 8 and an electric door lock system 9 are electrically connected to each other via an in-vehicle network 60 serving as a telecommunication line.

The in-vehicle network 60 is configured to serve as a controller area network (CAN), for example. The ECU 10 can control the electric door system 8 and the electric door lock system 9 by transmitting a control signal through the in-vehicle network 60. In addition, the ECU 10 can receive a detection result of a door sensor 8b and a lock sensor 9b via the in-vehicle network 60. The ECU 10 is an example of the vehicle control device.

The electric door system 8 has a plurality of actuators 8a for driving doors 3c to 3e which are electric doors, and a plurality of door sensors 8b for detecting an open/closed state of the doors 3c to 3e. The electric door system 8 opens and closes the doors 3c to 3e by operating the actuators 8a under the control of the ECU 10. The door sensors 8b detect an open state or a closed state of the doors 3c to 3e, and outputs the detection result to the ECU 10.

The electric door lock system 9 has a plurality of actuators 9a corresponding to the doors 3c to 3e, and a plurality of lock sensors 9b for detecting a locked/unlocked state of the doors 3c to 3e. The electric door lock system 9 locks or unlocks the doors 3c to 3e by operating the actuators 9a under the control of the ECU 10. The lock sensors 9b detect a locked state or an unlocked state of the doors 3c to 3e, and outputs the detection result to the ECU 10.

For example, the ECU 10 has a central processing unit (CPU) 20, a read only memory (ROM) 30, a random access memory (RAM) 40, and a solid state drive (SSD) 50.

The CPU 20 controls the whole vehicle 1. The CPU 20 is installed in a nonvolatile storage device such as the ROM 30, reads out a stored program, and can perform arithmetic processing in accordance with the program. The RAM 40 temporarily stores various items of data used for the arithmetic processing in the CPU 20. The SSD 50 is a rewritable nonvolatile storage unit, and can store data even in a case where a power source of the ECU 10 is turned off. The CPU 20, the ROM 30, and the RAM 40 can be integrated with each other inside the same package. Instead of the CPU 20, the ECU 10 may be configured to use other logical arithmetic processors such as a digital signal processor (DSP) or a logic circuit. Alternatively, a hard disk drive (HDD) may be provided instead of the SSD 50, and the SSD 50 and the HDD may be provided separately from the ECU 10.

A configuration, arrangement, and electrical connection form of the above-described various sensors and actuators are merely examples, and can be set (changed) in various ways.

In addition to the vehicle exterior camera 5, the in-vehicle camera 6, and the irradiation device 7, a plurality of antennas 4 are connected to the ECU 10. The plurality of antennas 4 are provided corresponding to the respective doors 3a to 3e, and receive radio waves emitted from an external device such as a smart key and a smartphone which are possessed by a user of the vehicle 1.

Figure 3:
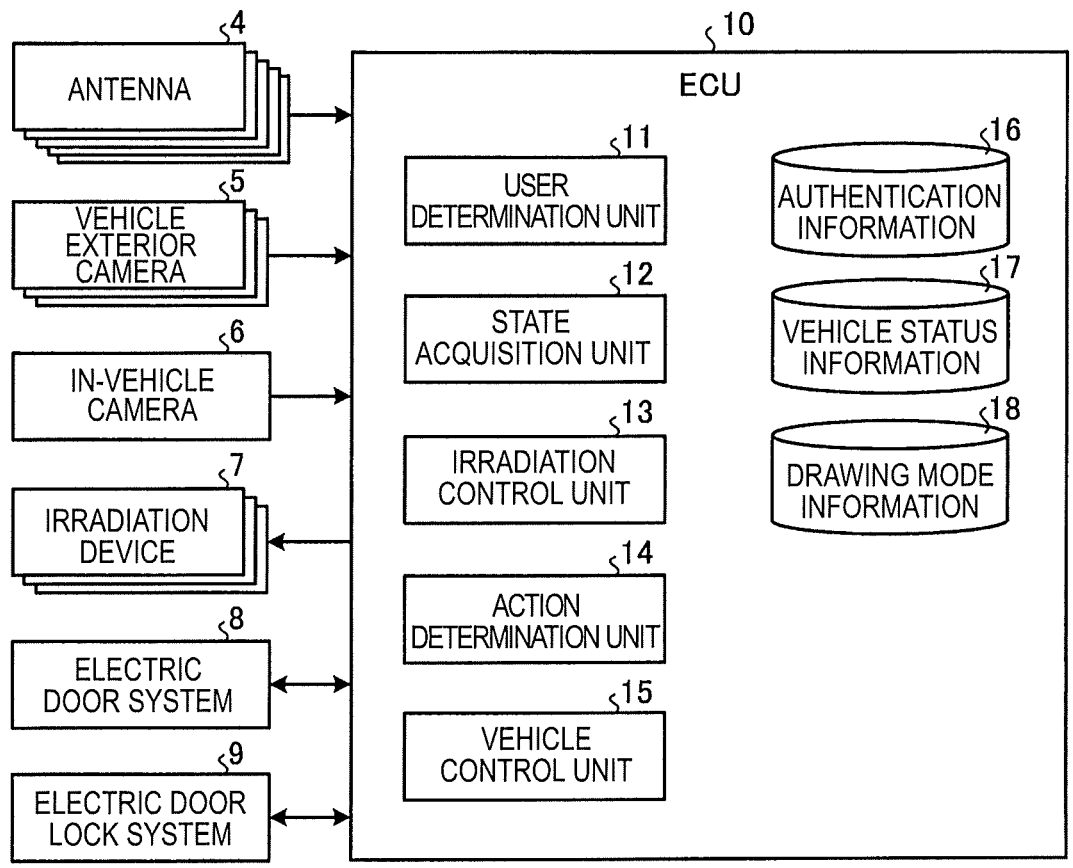
FIG. 3 is a block diagram illustrating an example of a functional configuration of an ECU according to the embodiment.

Next, a functional configuration of the ECU 10 will be described with reference to FIG. 3. FIG. 3 is a block diagram illustrating an example of the functional configuration of the ECU 10 according to the embodiment.

As illustrated in FIG. 3, the ECU 10 includes a user determination unit 11, a state acquisition unit 12, an irradiation control unit 13, an action determination unit 14, and a vehicle control unit 15. In addition, the ECU 10 stores authentication information 16, vehicle status information 17, and drawing mode information 18. Among these, the configurations excluding the authentication information 16, the vehicle status information 17, and the drawing mode information 18 are realized by causing the CPU 20 configured to serve as the ECU 10 to execute a program stored inside the ROM 30. The configurations may be realized using hardware. In addition, the authentication information 16, the vehicle status information 17, and the drawing mode information 18 are stored in a storage medium such as the SSD 50.

The authentication information 16 is information for authenticating the user of the vehicle 1. For example, the authentication information 16 is identification information such as an ID assigned to the external device such as the smart key and the smartphone.

The user authentication is not limited to a method performed using the external device. For example, the user authentication may be a method using biometric authentication such as face authentication, fingerprint authentication, vein authentication, and iris authentication. In this case, biometric information of the user is registered as the authentication information 16.

The vehicle status information 17 is information indicating a vehicle status including a vehicle interior state, a vehicle exterior state, and a state of the vehicle 1, and is stored by the state acquisition unit 12 (to be described later).

For example, the "vehicle interior state" includes an unoccupied state of the seats 2a to 2d. For example, the "vehicle exterior state" includes a position of the user which is determined by the user determination unit 11 (to be described later). For example, the position of the user means any one of the "right side of the vehicle 1", the "left side of the vehicle 1" and "behind the vehicle 1". In addition, the "vehicle exterior state" includes a state of the road surface around the vehicle 1, particularly, around a vehicle riding position. For example, the state of the road surface includes the presence or absence of an object which may interfere with vehicle riding, such as a puddle or an object placed on the road surface. For example, the "state of the vehicle 1" includes an open/closed state and a locked/unlocked state of the doors 3c to 3e serving as the electric doors, an on/off state of an engine, a state of an ignition switch, and a state of a dimmer switch.

The drawing mode information 18 is information obtained by associating a plurality of drawing modes including drawing patterns and drawing positions which are drawn on the road surface by the irradiation device 7 with the above-described vehicle status.

Figure 4:
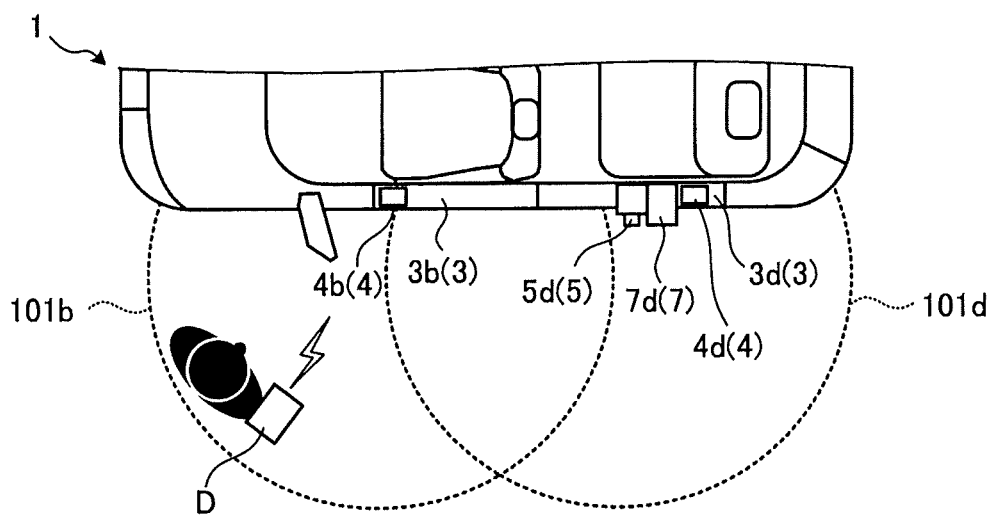
FIG. 4 is a view illustrating an example of a user determination process performed by a user determination unit.

The user determination unit 11 determines whether or not the user of the vehicle 1 is present around the vehicle 1. FIG. 4 is a view illustrating an example of a user determination process performed by the user determination unit 11.

As illustrated in FIG. 4, the user of the vehicle 1 possesses an external device D such as the smart key and the smartphone. If the external device D enters a receiving range of the antenna 4, the antenna 4 receives the radio wave including identification information from the external device D, and outputs the received identification information to the user determination unit 11. The user determination unit 11 collates the identification information of the external device D which is acquired from the antenna 4 with the identification information stored as the authentication information 16. If both of these coincide with each other, it is determined that the user of the vehicle 1 is present around the vehicle 1.

FIG. 4 illustrates an example where the external device D enters a receiving range 101b of an antenna 4b disposed corresponding to the door 3b and the antenna 4b receives the radio wave from the external device D. In a case where the external device D enters a receiving range 101d of an antenna 4d disposed corresponding to the receiving range 101b of the antenna 4b or the door 3d and the antenna 4b or the antenna 4d receives the radio wave from the external device D, the user determination unit 11 determines that the user is present on the left side of the vehicle 1, and transmits information relating to the position of the user to the state acquisition unit 12. Similarly, in a case where the radio wave of the external device D is received by the antenna 4 disposed corresponding to the door 3a or the door 3c, the user determination unit 11 determines that the user is present on the right side of the vehicle 1. In a case where the radio wave of the external device D is received by the antenna 4 disposed corresponding to the door 3e, the user determination unit 11 determines that the user is present behind the vehicle 1. In this way, the position of the user which is determined by the user determination unit 11 is stored as the "vehicle exterior state" of the vehicle status information 17.

Without being limited to the user authentication using the external device D, the user determination unit 11 may perform the user authentication using biometric authentication such as face authentication, fingerprint authentication, vein authentication, and iris authentication, for example.

The state acquisition unit 12 acquires the vehicle interior state in the vehicle 1, the vehicle exterior state, and the state of the vehicle 1.

For example, as the "state of the vehicle 1", the state acquisition unit 12 acquires an open/closed state and a locked/unlocked state of the doors 3c to 3e, an on/off state of the engine, a state of the ignition switch, and a state of the dimmer switch, from the vehicle 1. Specifically, the open/closed state of the doors 3c to 3e is obtained from the door sensor 8b of the electric door system 8, the locked/unlocked state of the doors 3c to 3e is obtained from the lock sensor 9b of the electric door lock system 9. Similarly, the state of the vehicle 1 is obtained from a sensor (not illustrated) via the in-vehicle network 60. The open/closed state of the doors 3c to 3e includes a state where the doors 3c to 3e are in an opening operation and a state where the doors 3c to 3e are in a closing operation.

In addition, the state acquisition unit 12 acquires the position of the user from the user determination unit 11, as the "vehicle exterior state". In addition, the state acquisition unit 12 analyzes a vehicle exterior image captured by the vehicle exterior cameras 5c to 5e, thereby acquiring the vehicle exterior state such as a puddle on the road surface and the presence or absence of other obstacles.

In addition, the state acquisition unit 12 analyzes a vehicle interior image captured by the in-vehicle camera 6, thereby acquiring an unoccupied state as the "vehicle interior state".

For example, the state acquisition unit 12 may acquire the unoccupied state, based on a detection result of a load sensor, a capacitance sensor, a far infrared sensor, a motion sensor, or a Doppler sensor disposed for each of the seats 2a to 2d.

The state acquisition unit 12 stores the acquired vehicle interior state in the vehicle 1, the vehicle exterior state, and the state of the vehicle 1, as the vehicle status information 17 in a storage medium such as the SSD 50.

Figure 5:
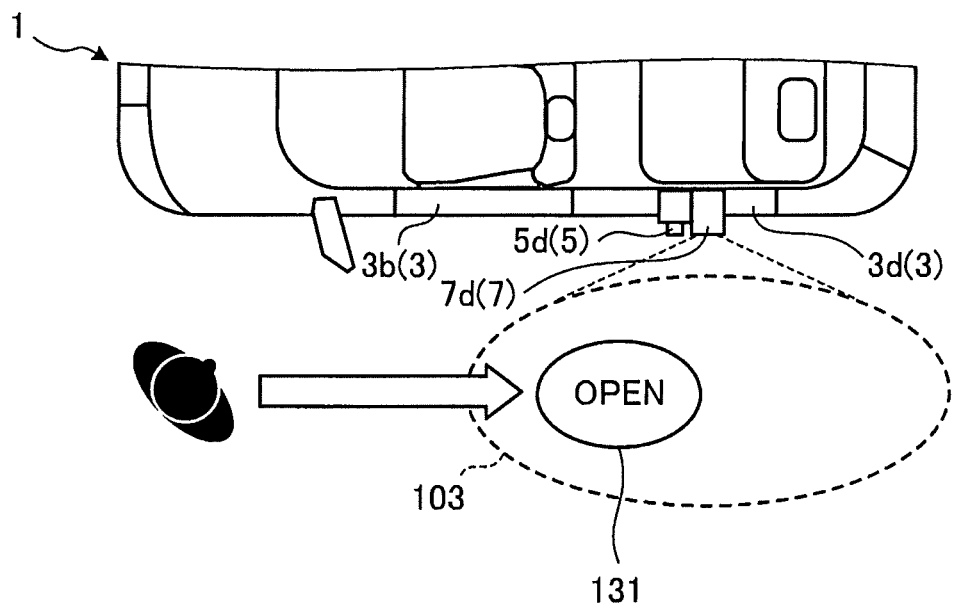
FIG. 5 is a view illustrating an example of a drawing mode in a case where a door is in a closed state.
Figure 6:
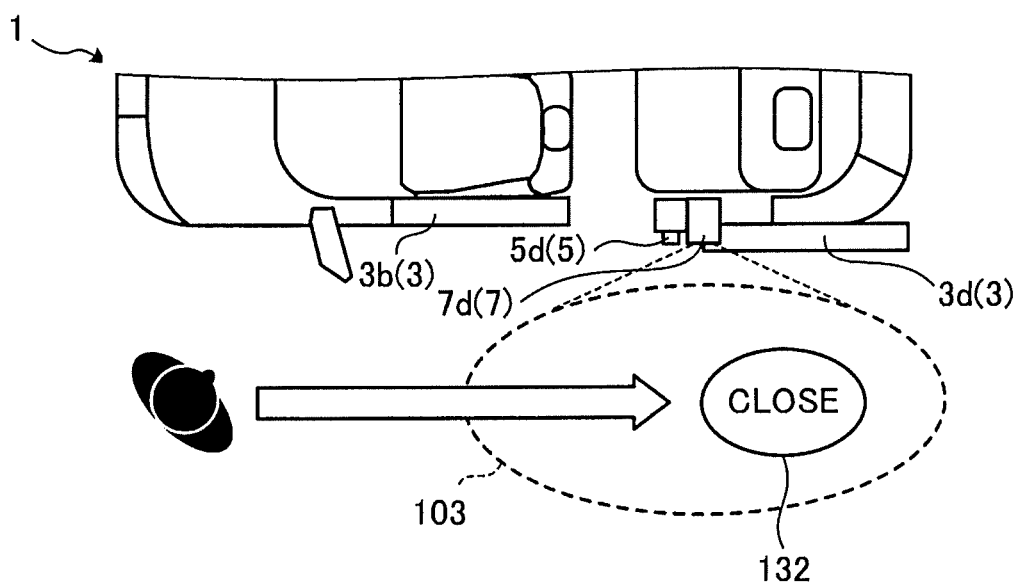
FIG. 6 is a view illustrating an example of a drawing mode in a case where the door is in an open state.

The irradiation control unit 13 controls the irradiation device 7 in accordance with the vehicle status information 17 and the drawing mode information 18. Herein, an example of an irradiation control process performed by the irradiation control unit 13 will be described with reference to FIGS. 5 and 6. FIG. 5 is a view illustrating an example of a drawing mode in a case where the door 3d is in a closed state. FIG. 6 is a view illustrating an example of a drawing mode in a case where the door 3d is in an open state.

For example, the irradiation control unit 13 acquires the position of the user as the "vehicle exterior state" from the vehicle status information 17. In addition, the irradiation control unit 13 acquires an open/closed state of the doors 3c to 3e as the "state of the vehicle 1" from the vehicle status information 17. Then, the irradiation control unit 13 causes the irradiation device 7 corresponding to the position of the user to irradiate the position of the user with light in a drawing mode corresponding to the open/closed state of the doors 3c to 3e.

FIG. 5 illustrates an example in which the user of the vehicle 1 is present on the left side of the vehicle 1 and the door 3d of the vehicle 1 is in a closed state. In this case, the irradiation control unit 13 causes the irradiation device 7d disposed on the left side of the vehicle 1 to draw a determination area 131 on the road surface. The determination area 131 is a region where it is determined whether or not the user performs a predetermined action as an action for opening the door 3d. For example, the determination area 131 is indicated using a drawing pattern in which letters of "OPEN" are written in an ellipse.

On the other hand, FIG. 6 illustrates an example in which the user of the vehicle 1 is present on the left side of the vehicle 1 and the door 3d of the vehicle 1 is in an open state. In this case, the irradiation control unit 13 causes the irradiation device 7d disposed on the left side of the vehicle 1 to draw a determination area 132 on the road surface. The determination area 132 is a region where it is determined whether or not the user performs a predetermined action as an action for closing the door 3d. For example, the determination area 132 is indicated using a drawing pattern in which letters of "CLOSE" are written in an ellipse. The determination area 132 is drawn at a position different from that of the determination area 131 drawn when the door 3d is in the closed state inside the irradiation-available region 103 of the irradiation device 7d.

In this way, the irradiation control unit 13 can guide the user to the determination areas 131 and 132 by controlling the irradiation device 7, based on the information acquired by the state acquisition unit 12.

Figure 7:
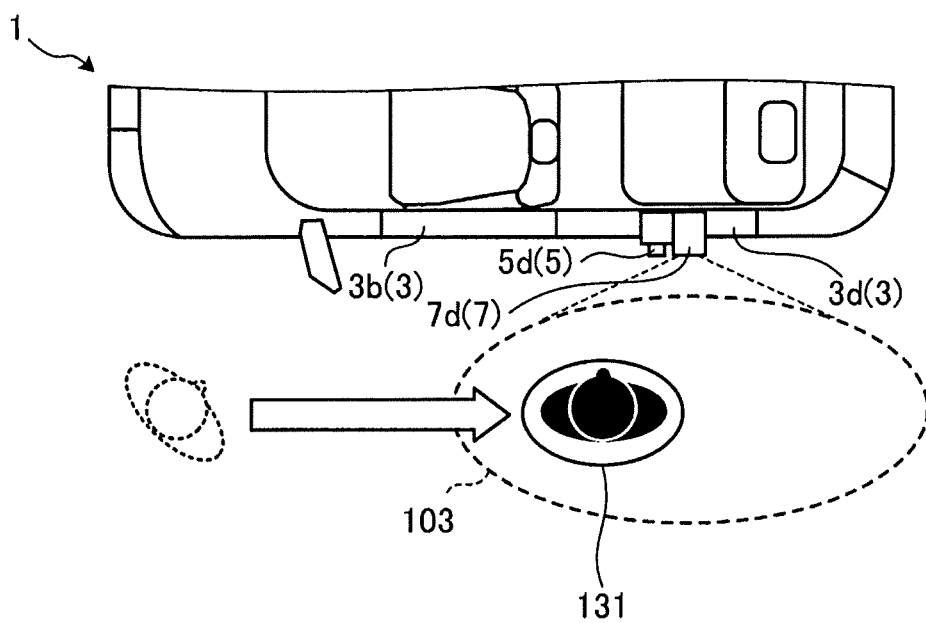
FIG. 7 is a view illustrating an example of an action determination process performed by an action determination unit.

The action determination unit 14 determines the action of the user present in the determination areas 131 and 132. Herein, an example of an action determination process performed by the action determination unit 14 will be described with reference to FIG. 7. FIG. 7 is a view illustrating the example of the action determination process performed by the action determination unit 14.

FIG. 7 illustrates a state where the determination area 131 is drawn by the irradiation device 7d. As illustrated in FIG. 7, the user enters the determination area 131 and stands still. A posture of the user in the determination area 131 is imaged by the vehicle exterior camera 5d, and an image thereof is output to the action determination unit 14. Then, the action determination unit 14 identifies the position of the user by analyzing the image captured by the vehicle exterior camera 5d.

The action determination unit 14 measures a time during which the user is present in the determination area 131. Then, in a case where the time during which the user is present in the determination area 131 exceeds a threshold value, the action determination unit 14 determines that the action for opening the door 3d (herein, an action for entering the determination area 131 and standing still) is performed by the user.

This configuration is similarly applied to a case where the determination area 132 is drawn by the irradiation device 7d. That is, the action determination unit 14 measures the time during which the user is present in the determination area 132. Then, in a case where the time during which the user is present in the determination area 132 exceeds a threshold value time, the action determination unit 14 determines that the action for closing the door 3d (herein, an action for entering the determination area 132 and standing still) is performed by the user.

The action determination unit 14 determines the action of the user in the determination areas 131 and 132 drawn by the light. Accordingly, even in a case where the periphery of the vehicle 1 is dark, the action of the user can be accurately determined.

The action determination unit 14 may determine the action for opening the door 3d in the determination area 131, for example, in a case where pre-registered gesture such as a waving action and a foot raising action is performed.

In addition, herein, an example has been described in which the irradiation device 7 is caused to draw a static determination area whose drawing mode is not changed. However, the irradiation control unit 13 may cause the irradiation device 7 to draw a dynamic determination area in which the letters of "OPEN" or "CLOSE" are moved or like animation characters, for example.

In addition, herein, an example has been described in which the action of the user is determined by analyzing the image captured by the vehicle exterior camera 5d. However, the action of the user may be determined, based on a detection result of other sensors such as a capacitance sensor and an infrared sensor.

Figure 8:
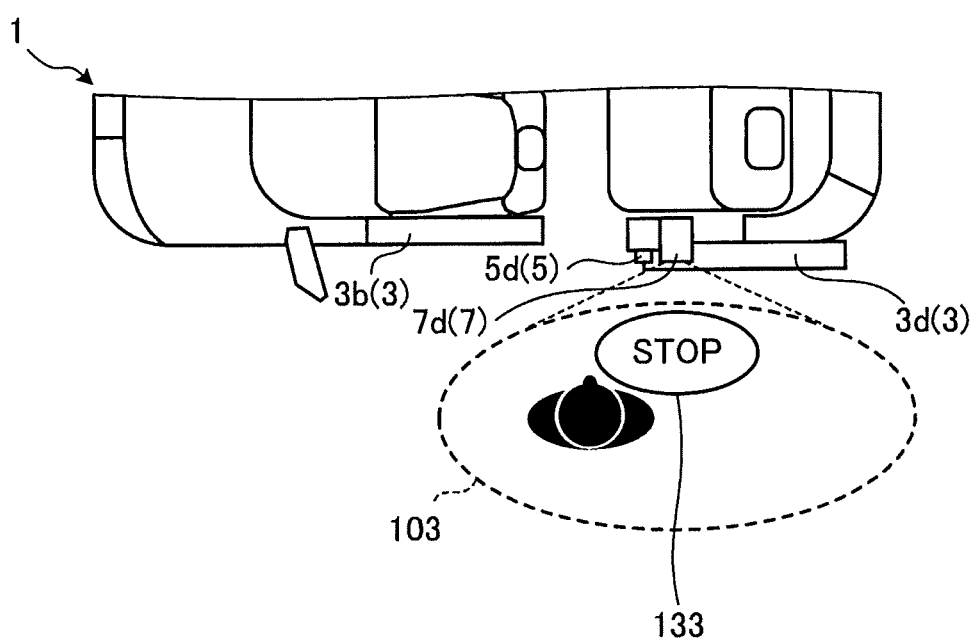
FIG. 8 is a view illustrating an example of a vehicle control process performed by a vehicle control unit.

The vehicle control unit 15 controls the vehicle 1, based on the action of the user which is determined by the action determination unit 14. FIG. 8 is a view illustrating an example of a vehicle control process performed by the vehicle control unit 15.

For example, in a case where the action determination unit 14 determines the action for opening the door 3d in FIG. 7, the vehicle control unit 15 causes the electric door system 8 to perform the action for opening the door 3d as illustrated in FIG. 8.

In this way, the user who wants to open the door 3d enters the determination area 131 and stands still, for example. In this manner, the user can communicate the user's intention to open the door 3d to the vehicle 1, and the vehicle 1 can open the door 3d by receiving the user's intention.

As illustrated in FIG. 8, during the opening operation of the door 3d, the irradiation control unit 13 may cause the irradiation device 7d to draw a determination area 133. For example, the determination area 133 is indicated using a drawing pattern in which letters of "STOP" are written in an ellipse, and is drawn at a location different from that of the determination areas 131 and 132. In a case where a time during which the user is present in the determination area 133 and the time during which the user is present in the determination area 133 exceeds a threshold value, the action determination unit 14 determines that an action for stopping the opening operation of the door 3d (herein, the action for entering the determination area 133 and standing still) is performed by the user. In a case where the action for stopping the opening operation of the door 3d is determined by the action determination unit 14, the vehicle control unit 15 causes the electric door system 8 to stop the opening operation of the door 3d. In this manner, the user can communicate the user's intention to stop opening the door 3d to the vehicle 1. Therefore, the vehicle 1 can stop the opening operation of the door 3d by receiving the user's intention.

Figure 9:
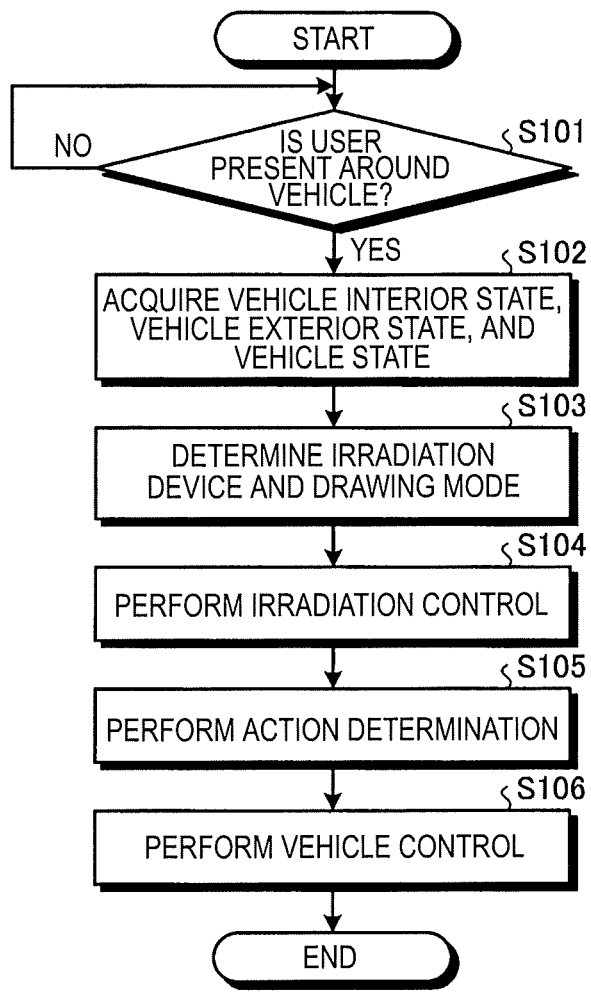
FIG. 9 is a flowchart illustrating a procedure example of a process performed by the ECU.
Figure 10:
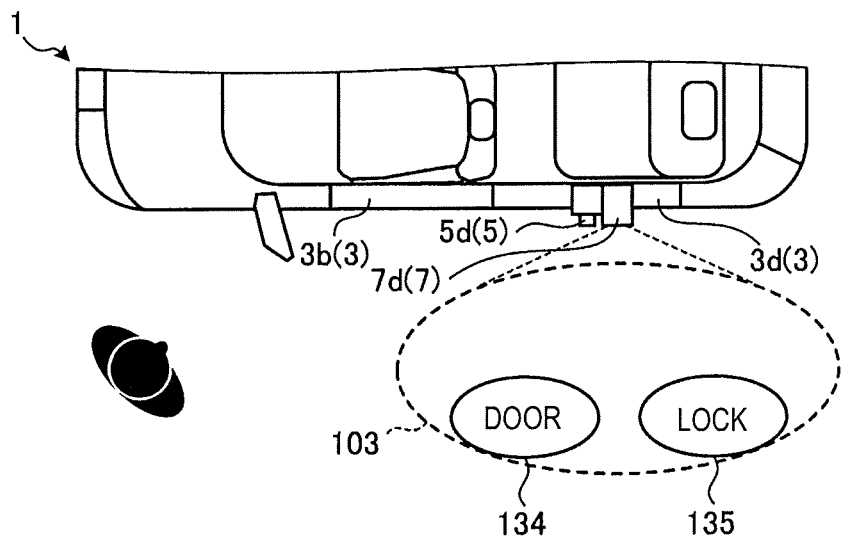
FIG. 10 is a view illustrating an example of a drawing mode in a case where an irradiation device is caused to draw a plurality of determination areas on a road surface.

Next, a specific operation of the ECU 10 will be described with reference to FIG. 9. FIG. 9 is a flowchart illustrating a procedure example of a process performed by the ECU 10.

As illustrated in FIG. 9, the ECU 10 determines whether or not the user is present around the vehicle 1 (Step S101). In a case where the user is not present around the vehicle 1 (No in Step S101), the ECU 10 returns to the process in Step S101, and repeats the determination process in Step S101.

In a case where it is determined that the user is present around the vehicle 1 in Step S101 (Yes in Step S101), the ECU 10 acquires the vehicle interior state, the vehicle exterior state, and the state of the vehicle 1 (Step S102). Then, in accordance with the acquired states, the ECU 10 determines the irradiation device 7 and the drawing mode for irradiating the drawing pattern with the light (Step S103), and performs irradiation control (Step S104). For example, in a case where the user is present on the left side of the vehicle 1 and the door 3d is closed, the ECU 10 causes the irradiation device 7d disposed on the left side of the vehicle 1 to draw the determination area 131 on the road surface.

Subsequently, the ECU 10 performs the action determination of the user (Step S105). For example, in a case where the user stands still in the determination area 131 for a prescribed time, the ECU 10 determines that the action for opening the door 3d is performed by the user. In addition, in a case where the user stands still in the determination area 132 for a prescribed time, the ECU 10 determines the action for closing the door 3d is performed by the user.

Then, the ECU 10 controls the vehicle 1, based on the action of the user which is determined in Step S105 (step S106). For example, in a case where it is determined that the action for opening the door 3d is performed by the user in Step S105, the ECU 10 performs control to open the door 3d. In addition, in a case where it is determined that the action for closing the door 3d is performed by the user in Step S105, the ECU 10 performs control to close the door 3d.

The control for opening and closing the above-described door 3d is an example of the process performed by the ECU 10 according to the embodiment. Hereinafter, another example of the process performed by the ECU 10 according to the embodiment will be described.

The ECU 10 may provide the user with a plurality of options relating to the vehicle control by causing the irradiation device 7 to draw a plurality of determination areas on the road surface. An example in this case will be described with reference to FIGS. 10 to 14. FIGS. 10 to 14 are views illustrating an example of drawing modes in a case where the irradiation device 7 is caused to draw the plurality of the determination areas on the road surface.

For example, the irradiation control unit 13 causes the irradiation device 7d to draw two determination areas 134 and 135 on the road surface. For example, the determination area 134 is indicated using a drawing pattern in which letters of "DOOR" are written in an ellipse. In addition, for example, the determination area 135 is indicated using a drawing pattern in which letters of "LOCK" are written in an ellipse.

Figure 11:
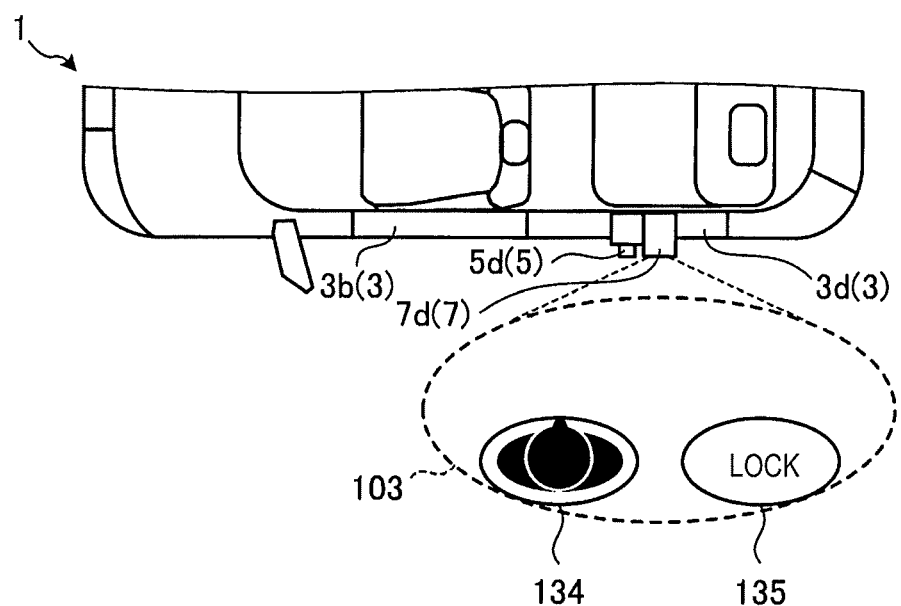
FIG. 11 is a view illustrating an example of the drawing mode in the case where the irradiation device is caused to draw the plurality of determination areas on the road surface.

Herein, as illustrated in FIG. 11, in a case where the user enters the determination area 134 and stands still for a prescribed time, the action determination unit 14 determines that the action for opening the door 3d is performed by the user.

Figure 12:
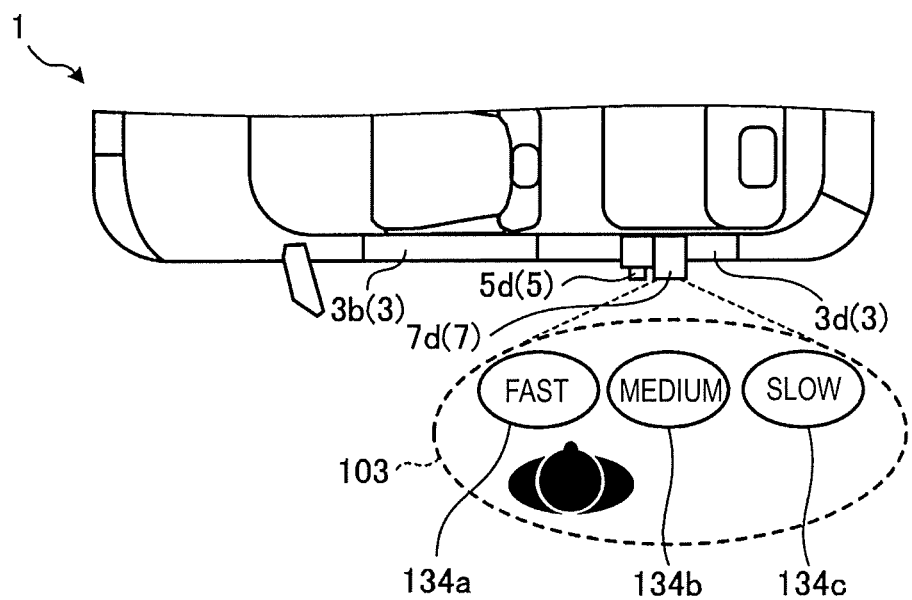
FIG. 12 is a view illustrating an example of the drawing mode in the case where the irradiation device is caused to draw the plurality of determination areas on the road surface.

In this case, the irradiation control unit 13 causes the irradiation device 7d to draw determination areas 134a to 134c on the road surface as illustrated in FIG. 12. For example, the determination area 134a is indicated using a drawing pattern in which letters of "FAST" are written in an ellipse, and the determination area 134b is indicated using a drawing pattern in which letters of "medium" are written in an ellipse, and the determination area 134c is indicated using a drawing pattern in which letters of "SLOW" are written in an ellipse.

Then, for example, in a case where the user enters the determination area 134a and stands still for a prescribed time, the action determination unit 14 determines that an action for opening the door 3d at a first speed is performed by the user. Then, the vehicle control unit 15 causes the electric door system 8 to perform an operation for opening the door 3d at the first speed. In addition, in a case where the user enters the determination area 134b and stands still for a prescribed time, the action determination unit 14 determines that an action for opening the door 3d at a second speed which is slower than the first speed is performed by the user. Then, the vehicle control unit 15 causes the electric door system 8 to perform an operation for opening the door 3d at the second speed. In addition, in a case where the user enters the determination area 134c and stands still for a prescribed time, the action determination unit 14 determines that an action for opening the door 3d at a third speed which is slower than the second speed is performed by the user. Then, the vehicle control unit 15 causes the electric door system 8 to perform an operation for opening the door 3d at the third speed.

Figure 13:
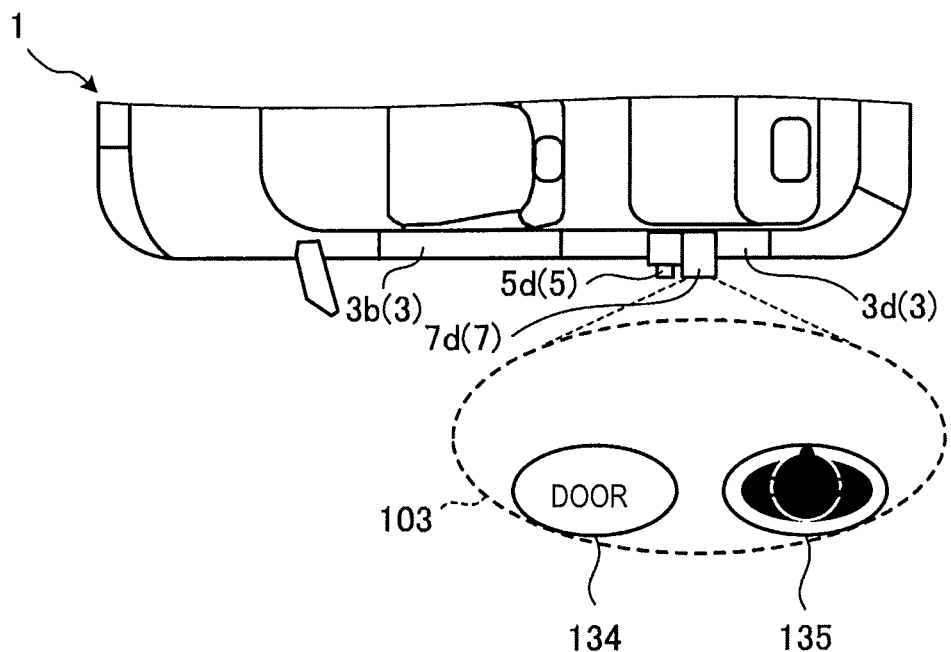
FIG. 13 is a view illustrating an example of the drawing mode in the case where the irradiation device is caused to draw the plurality of determination areas on the road surface.

On the other hand, as illustrated in FIG. 13, in a case where the user enters the determination area 135 and stands still for a prescribed time, the action determination unit 14 determines that an action for locking or unlocking the door 3d is performed by the user.

Figure 14:
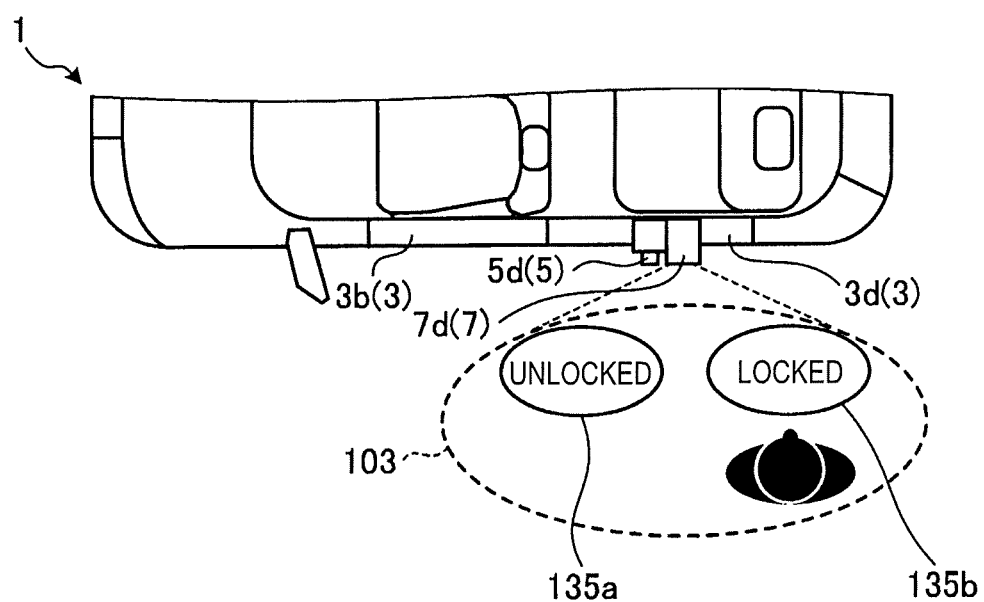
FIG. 14 is a view illustrating an example of the drawing mode in the case where the irradiation device is caused to draw the plurality of determination areas on the road surface.

In this case, as illustrated in FIG. 14, the irradiation control unit 13 causes the irradiation device 7 to draw determination areas 135a and 135b on the road surface as illustrated in FIG. 14. For example, the determination area 135a is indicated using a drawing pattern in which letters of "UNLOCKED" are written in an ellipse. For example, the determination area 135b is indicated using a drawing pattern in which letters of "LOCKED" are written in an ellipse.

Then, for example, in a case where the user enters the determination area 135a and stands still for a prescribed time, the vehicle control unit 15 causes the electric door lock system 9 to perform an operation for unlocking the door 3d. In addition, in a case where the user enters the determination area 135b and stands still for a prescribed time, the vehicle control unit 15 causes the electric door lock system 9 to perform an operation for locking the door 3d. The determination area 135 is indicated using the drawing pattern in which the letters are written. However, the determination area 135 may be indicated using a picture or a drawing representing a key instead of the letters.

In this way, the ECU 10 causes the irradiation device 7 to draw the plurality of determination areas on the road surface. In a case where the action of the user is determined in any one determination area of the plurality of determination areas, the ECU 10 performs vehicle control corresponding to the determination area where the action of the user is determined. In this manner, the user can be provided with the plurality of options relating to the vehicle control. Accordingly, the user can control the vehicle 1 by selecting desired vehicle control from the plurality of options.

Herein, an example has been described in which control items include the operation for opening and closing the doors 3c to 3e and the opening/closing speed, and the operation for locking and unlocking the doors 3c to 3e. However, the control items are not limited thereto. In addition, the number of the control items can increase in the future. In this case, even if it becomes necessary to increase the number of the drawing modes, it is not necessary to add hardware. Therefore, the control items can be added at low cost.

In the embodiment described above, the irradiation device 7 corresponding to the position of the user is caused to draw the determination area. In this manner, the determination area is caused to appear at a location close to the user, and the user is guided to the location.

Without being limited to this configuration, the ECU 10 may determine a guidance destination of the user in accordance with the vehicle exterior state, for example. An example in this case will be described with reference to FIGS. 15 to 18. FIGS. 15 to 18 are views illustrating an example of a process for determining the guidance destination of the user in accordance with the vehicle exterior state.

Figure 15:
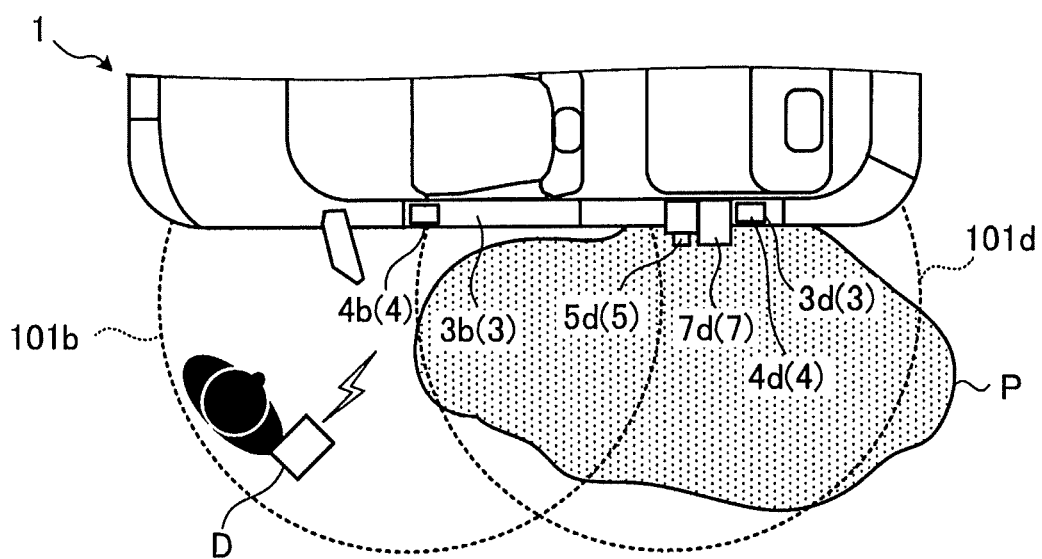
FIG. 15 is a view illustrating an example of a process for determining a guidance destination of a user in accordance with a vehicle exterior state.

For example, as illustrated in FIG. 15, it is assumed that the presence of the user is determined on the left side of the vehicle 1.

Herein, it is assumed that a puddle P is present on the road surface on the left side of the vehicle 1. As the vehicle exterior state, the state acquisition unit 12 acquires a state of the road surface where the puddle P is present by analyzing an image captured by the vehicle exterior camera 5d. The state acquisition unit 12 also acquires a state of the road surface on the right side of the vehicle 1 by analyzing an image captured by the vehicle exterior camera 5c disposed on the right side of the vehicle 1. Herein, it is assumed that no puddle is present on the road surface on the right side of the vehicle 1.

Figure 16:
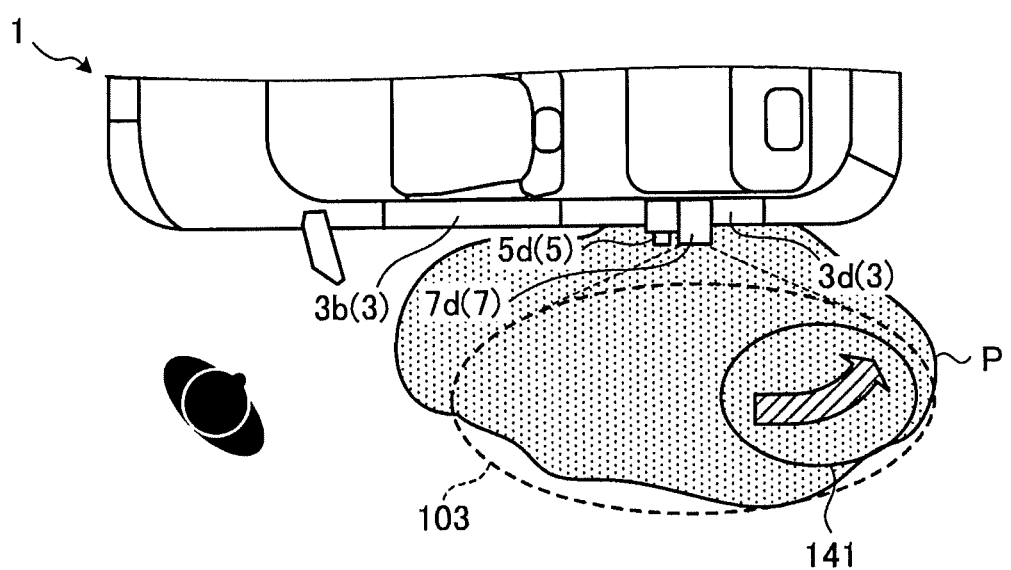
FIG. 16 is a view illustrating an example of the process for determining the guidance destination of the user in accordance with the vehicle exterior state.

In this case, as illustrated in FIG. 16, the irradiation control unit 13 causes the irradiation device 7d disposed on the left side of the vehicle 1 to draw a guidance pattern 141 on the road surface. For example, the guidance pattern 141 is indicated using a drawing pattern in which an arrow for guiding the user rearward of the vehicle 1 is written in an ellipse.

Figure 17:
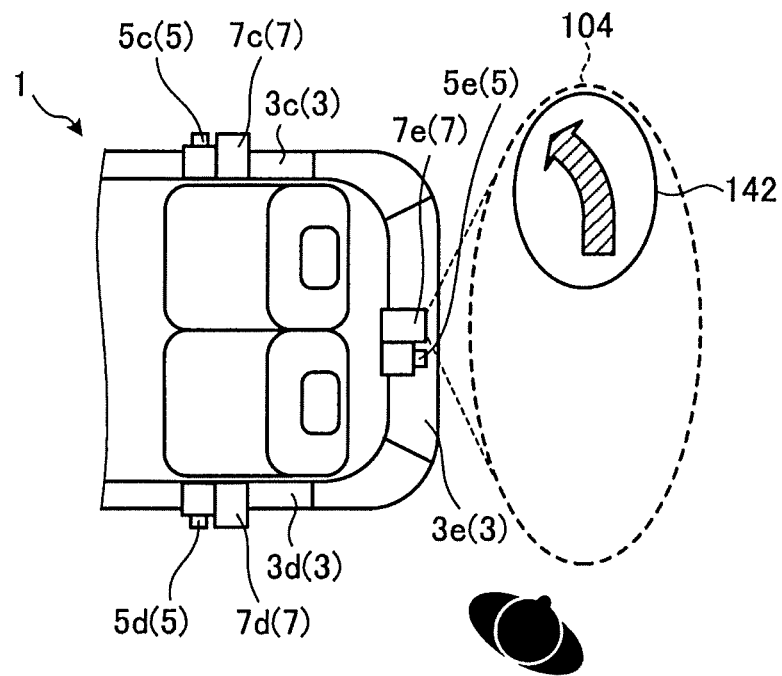
FIG. 17 is a view illustrating an example of the process for determining the guidance destination of the user in accordance with the vehicle exterior state.

In addition, as illustrated in FIG. 17, the irradiation control unit 13 causes the irradiation device 7e disposed behind the vehicle 1 to draw a guidance pattern 142 on the road surface. For example, the guidance pattern 142 is indicated using a drawing pattern in which an arrow for guiding the user rightward of the vehicle 1 is written in an ellipse.

Figure 18:
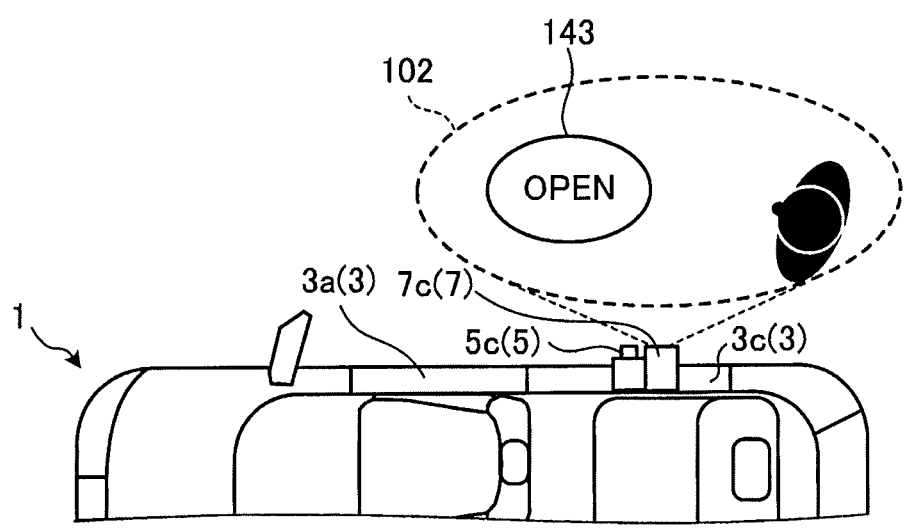
FIG. 18 is a view illustrating an example of the process for determining the guidance destination of the user in accordance with the vehicle exterior state.

In addition, as illustrated in FIG. 18, the irradiation control unit 13 causes the irradiation device 7c disposed on the right side of the vehicle 1 to draw the determination area 143 on the road surface. Then, in a case where the user enters the determination area 143 and stands still for a prescribed time, the action determination unit 14 determines that the action for opening the door 3c (herein, the action for entering the determination area 143 and standing still) is performed by the user. The vehicle control unit 15 causes the electric door system 8 to perform the operation for opening the door 3c.

In this way, the ECU 10 may acquire the state of the road surface as the vehicle exterior state so as to determine the guidance destination of the user in accordance with the acquired state of the road surface. In this manner, for example, the user can be guided to a location where the user is likely to get on the vehicle since the road surface has no obstacle. Herein, the puddle P has been described as an example. However, the obstacle on the road surface is not limited to the puddle P.

Figure 19:
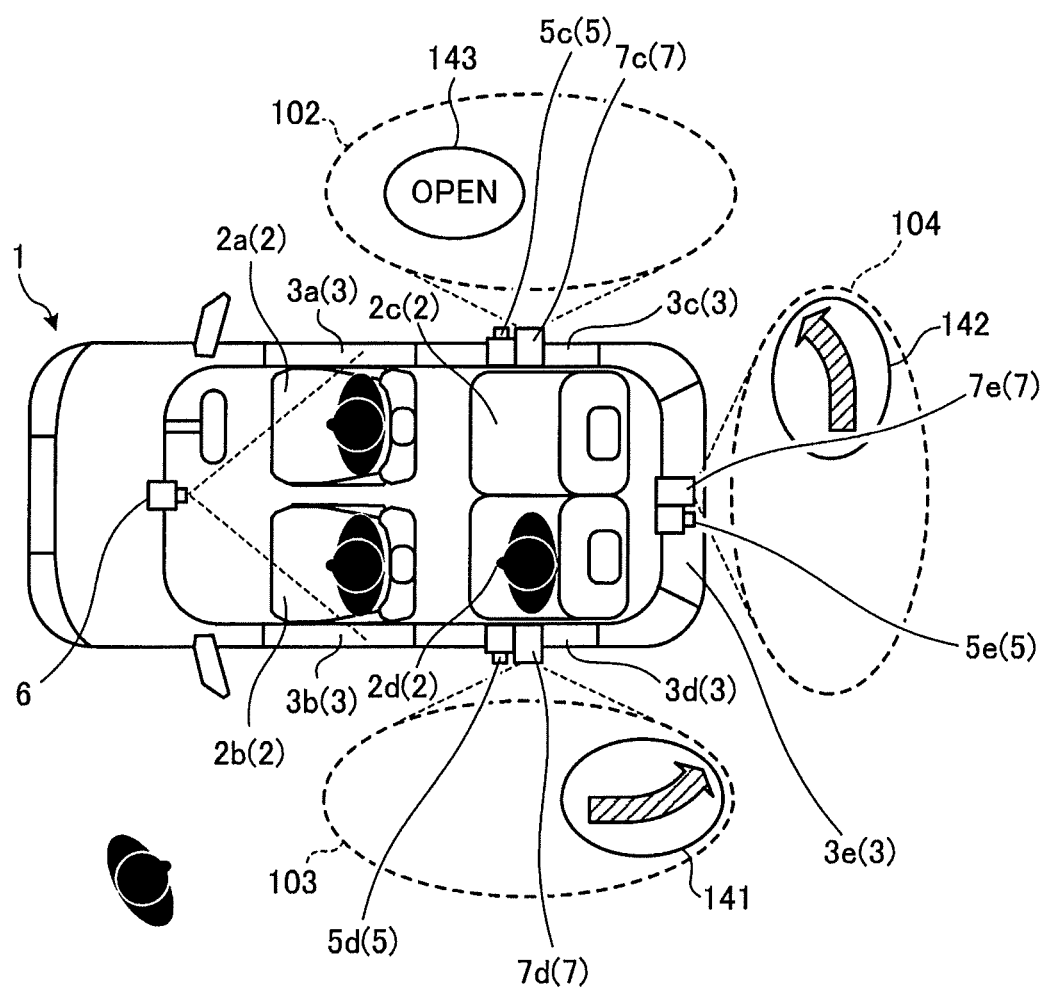
FIG. 19 is a view illustrating an example of the process for determining the guidance destination of the user in accordance with the vehicle exterior state.

In addition, the ECU 10 may determine the guidance destination of the user in accordance with the vehicle interior state, for example. An example in this case will be described with reference to FIG. 19. FIG. 19 is a view illustrating an example of a process for determining the guidance destination of the user in accordance with the vehicle interior state.

For example, as illustrated in FIG. 19, it is assumed that the presence of the user is determined on the left side of the vehicle 1.

The state acquisition unit 12 acquires an unoccupied state as the vehicle interior state by analyzing an image captured by the in-vehicle camera 6. Herein, it is assumed that only the rear seat 2c is an unoccupied seat out of the seats 2a to 2d.

In this case, the irradiation control unit 13 causes the irradiation device 7d to draw a guidance pattern 141 on the road surface, causes the irradiation device 7e to draw a guidance pattern 142 on the road surface, and causes the irradiation device 7c to draw a determination area 143 on the road surface. Then, in a case where the user enters the determination area 143 and stands still for a prescribed time, the action determination unit 14 determines that the action for opening the door 3c (herein, the action for entering the determination area 143 and standing still) is performed by the user, and the vehicle control unit 15 causes the electric door system 8 to perform the operation for opening the door 3c.

In this way, the ECU 10 may guide the user to the guidance destination corresponding to the unoccupied seat out of the plurality of guidance destinations corresponding to a plurality of vehicle riding positions in the vehicle 1. In this manner, for example, the user can be guided to a location where the user is likely to get on the vehicle since no person or no baggage is present.

In addition, the ECU 10 may determine the guidance destination of the user by taking account of both the vehicle interior state and the vehicle exterior state. That is, for example, in a case where the rear seat 2c and the rear seat 2d are unoccupied seats and the puddle P is present on the left side of the vehicle 1, the ECU 10 may guide the user rightward of the vehicle 1.

Figure 20:
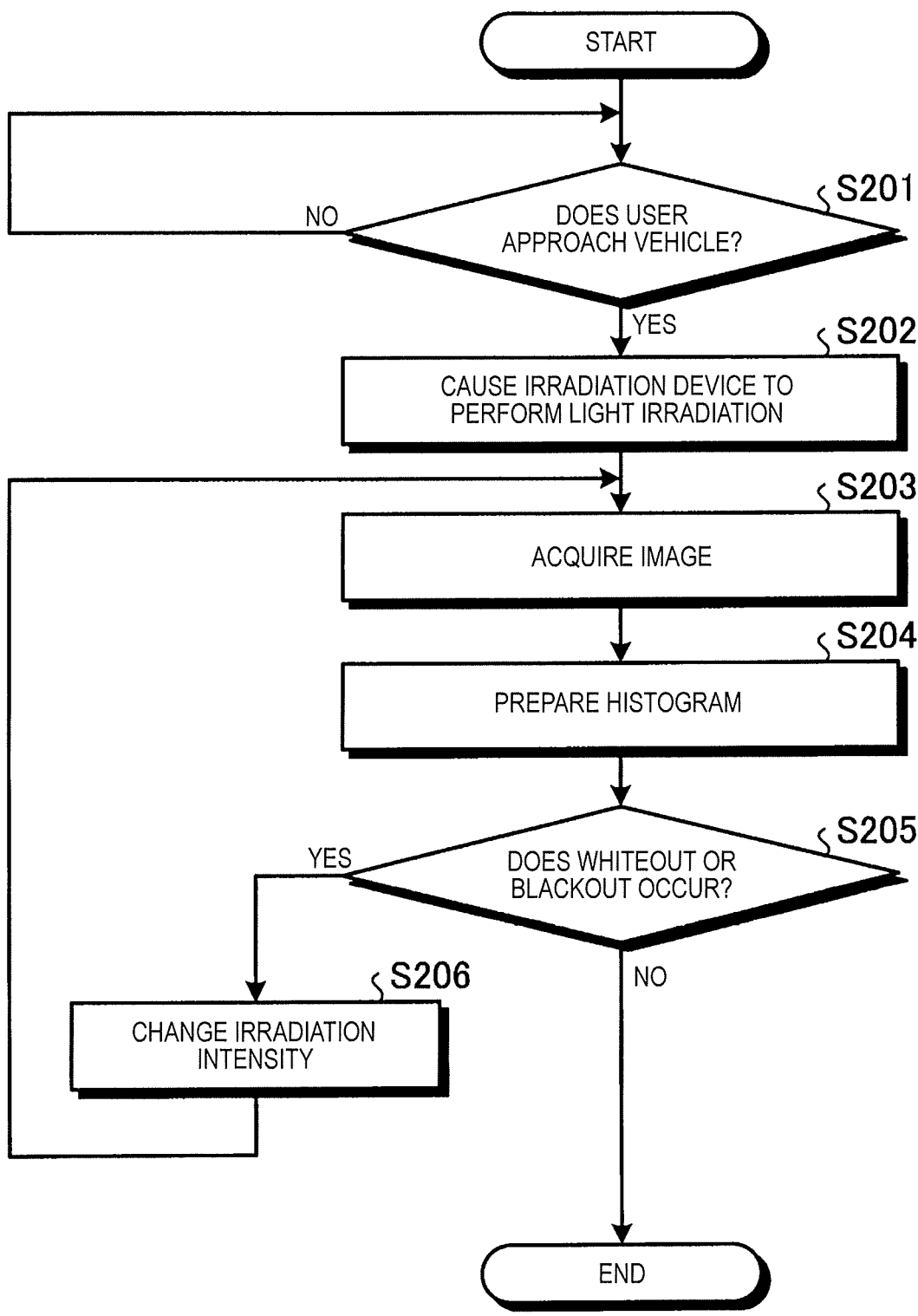
FIG. 20 is a flowchart illustrating a procedure example of an irradiation intensity adjustment process.

During the action determination process, the ECU 10 may perform a process for adjusting irradiation intensity of the irradiation device 7 in advance so as to capture a proper image having no whiteout or no blackout. FIG. 20 is a flowchart illustrating a procedure example of an irradiation intensity adjustment process.

As illustrated in FIG. 20, the ECU 10 determines whether or not the user approaches the vehicle 1 (Step S201). For example, in the ECU 10, a first antenna receiving the radio wave transmitted from a first external device (herein, a smartphone) possessed by the user and a second antenna (antenna 4 described above) receiving the radio wave transmitted from a second external device (herein, a smart key) are connected to each other. A receiving range of the first antenna is set to be wider than a receiving range of the second antenna.

The ECU 10 determines whether or not the user approaches the vehicle 1, based on strength of the radio wave received by the first antenna. For example, in a case where the first external device enters the receiving range of the first antenna and the reception strength increases with the lapse of time, the ECU 10 determines that the user approaches the vehicle 1. The radio wave transmitted from the first external device includes identification information of the first external device, and the ECU 10 can identify the user, based on the identification information.

The ECU 10 repeats the process in Step S201 until the ECU 10 determines that the user approaches the vehicle 1 (No in Step S201).

On the other hand, in a case where it is determined that the user approaches the vehicle 1 in Step S201 (Yes in Step S201), the ECU 10 causes the irradiation device 7 to irradiate the determination area with the light (Step S202), and acquires an image captured by the vehicle exterior camera 5 (Step S203). Herein, all of the irradiation devices 7c to 7e are caused to irradiate the determination areas with the light, and all of the vehicle exterior camera 5c to 5e are caused to image the determination areas. However, the ECU 10 may operate at least one irradiation device 7 and at least one vehicle exterior camera 5. For example, the ECU 10 may operate one or more irradiation devices 7 and one, two, or more vehicle exterior cameras 5 arranged in a direction in which the user approaches out of the plurality of irradiation devices 7 and the plurality of vehicle exterior camera 5. In Step S202, the ECU 10 may cause the irradiation device 7 to draw at least one determination area out of the plurality of determination areas which can be drawn. The drawing mode of the determination area in this case may be a drawing mode when the action determination such as "OPEN" and "CLOSE" is actually performed. Alternatively, the drawing mode may not include letters or figures, and may be used for the irradiation intensity adjustment process.

Subsequently, the ECU 10 prepares a histogram of the image acquired in Step S203 (Step S204). Specifically, the ECU 10 prepares a histogram with regard to pixels included in the determination area in the image acquired in Step S203. The histogram is information indicating the number of pixels having a pixel value or a luminance value for each pixel value or each luminance value.

Based on the prepared histogram, the ECU 10 determines whether or not whiteout or blackout appears in the determination area in the image acquired in Step S203 (Step S205). For example, in the ECU 10, in a case where a proportion of pixels whose pixel value is equal to or greater than a first threshold value (for example, "255") exceeds a second threshold value out of the plurality of pixels included in the determination area, the ECU 10 determines that the whiteout appears in the determination area in the image acquired in Step S203. In addition, in a case where the ECU 10 determines that a proportion of pixels whose pixel value is equal to or smaller than a third threshold value (for example, "0") exceeds a fourth threshold value out of the plurality of pixels included in the determination area, the ECU 10 determines that the blackout appears in the determination area in the image acquired in Step S203.

In Step S205, in a case where it is determined that the whiteout or the blackout appears (Yes in Step S205), the ECU 10 changes the irradiation intensity of the irradiation device 7 (Step S206). Specifically, in a case where it is determined that the whiteout appears, the ECU 10 weakens the irradiation intensity of the irradiation device 7. On the other hand, in a case where it is determined that the blackout appears, the ECU 10 strengthens the irradiation intensity of the irradiation device 7. Thereafter, the ECU 10 repeats the processes in Steps S203 to S206 until the whiteout or the blackout no longer appears. Then, in a case where it is determined in Step S205 that the whiteout or the blackout does not appear (No in Step S205), the ECU 10 completes the irradiation intensity adjustment process.

Thereafter, in a case where the second external device enters the receiving range of the second antenna, the ECU 10 determines that the user is present around the vehicle 1 (Yes in Step S101 in FIG. 9), and performs the processes in Steps S102 to S105. In this way, the ECU 10 can start to perform the irradiation intensity adjustment process before the action determination process (Step S105) starts.

In this way, the ECU 10 may adjust the irradiation intensity of the irradiation device 7 in accordance with the brightness around the vehicle 1. In this manner, the action determination process can be performed using the irradiation intensity which does not cause the whiteout or the blackout to appear. Therefore, the action of the user can be accurately determined.

Herein, in Step S201, it is determined whether or not the user approaches the vehicle 1. However, the ECU 10 does not necessarily need to determine "approach" of the user. That is, in a case where the first external device enters the receiving range of the first antenna, the ECU 10 may proceed to the process in Step S202.

Herein, a case has been described as an example in which the irradiation intensity of the irradiation device 7 is adjusted based on the pixel value of the image captured by the vehicle exterior camera 5. However, a method of adjusting the irradiation intensity of the irradiation device 7 is not limited to this example. For example, the ECU 10 may determine the brightness around the vehicle 1, based on environmental information such as the weather around the vehicle 1, the current season, and the current time zone, and may adjust the irradiation intensity in accordance with the determined brightness around the vehicle 1.

For example, if the weather around the vehicle 1 is "sunny", the ECU 10 may adjust the irradiation intensity to "strong" corresponding to "sunny". If the weather is "cloudy" or "rainy", the ECU 10 may adjust the irradiation intensity to "weak" corresponding to "cloudy" or "rain". In addition, if the present time zone is set as daytime, the ECU 10 may adjust the irradiation intensity to "strong" corresponding to "daytime". If the time zone is set as nighttime, the ECU 10 may adjust the irradiation intensity to "weak" corresponding to "nighttime". In this case, the ECU 10 may change the time zone set as "daytime" or "nighttime" by taking account of the current season information. Alternatively, the ECU 10 may adjust the irradiation intensity to "weak", for example, in a case where the vehicle 1 is located indoor, such as in an underground parking lot. The ECU 10 may adjust the irradiation intensity to "strong", for example, in a case where the vehicle 1 is located outdoor. In addition, the ECU 10 may acquire information on the brightness around the vehicle 1 from an illuminometer mounted on the vehicle 1, and may adjust the irradiation intensity in accordance with the acquired information.

The state acquisition unit 12 included in the ECU 10 may analyze a vehicle exterior image captured by the vehicle exterior cameras 5c to 5e so that a storage medium stores the vehicle status information 17 including whether an obstacle, for example, such as a wall and a tree, is present or absent above the road surface, as the "vehicle exterior state". In this case, the irradiation control unit 13 included in the ECU 10 may acquire the "vehicle exterior state" from the vehicle status information 17, and may change the drawing mode of the determination area, based on the information relating to whether the obstacle such as the wall and the tree is present or absent in the acquired "vehicle exterior state".

For example, the irradiation control unit 13 determines whether or not the obstacle such as the wall or the tree is present in a region where the determination area is to be drawn (hereinafter, referred to as a "drawing-planned region"). In other words, the irradiation control unit 13 determines whether or not the width of the road surface on which the determination area is drawn is sufficiently secured. In a case where the irradiation control unit 13 determines that the obstacle is present in the drawing-planned region, the irradiation control unit 13 draws the determination area in a drawing mode for avoiding the obstacle. For example, the irradiation control unit 13 changes a shape or a size of the determination area, or shifts a drawing position of the determination area so that the determination area is not drawn on the wall or the tree. In this manner, even under the environment where the obstacle such as the wall and the tree is present, the user can communicate the user's intention to the vehicle 1. For example, the irradiation control unit 13 may select a pattern which does not interfere with the obstacle from a plurality of patterns (shape patterns, size patterns, or position patterns) stored as the shape of the determination area, and may cause the irradiation device 7 to irradiate the determination area having the selected pattern with the light.

In the above-described embodiment, an example of determining the action for entering the determination area and standing still has been described. In this case, while the action determination unit 14 determines the action of the user, the irradiation control unit 13 may dynamically change the drawing mode in accordance with a progress level of the action determination so that the user can be fully informed of the progress level of the action determination.

For example, the irradiation control unit 13 may change a color of the determination area in accordance with a time during which the user is present in the determination area. In addition, the irradiation control unit 13 may cause the light to blink in the determination area and may gradually increase the blinking frequency of the determination area with the lapse of time during which the user is present in the determination area. In this way, the irradiation control unit 13 may change the drawing mode of the determination area in accordance with the time during which the user is present in the determination area.

In addition, the irradiation control unit 13 may draw an image indicating a progress level of the action determination together with the determination area. In this case, the irradiation control unit 13 dynamically changes the image indicating the progress level of the action determination, in accordance with the time during which the user is present in the determination area. For example, the irradiation control unit 13 may draw an image of an hourglass, and may change a sand ratio in an upper portion and a lower portion of the hourglass in accordance with the time during which the user is present in the determination area. In addition, the irradiation control unit 13 may draw an image of a timer, and may set the number of the timer as close to zero with the lapse of time during which the user is present in the determination area. In addition, the irradiation control unit 13 may draw an image of a gauge, and may gradually change an empty state of the gauge to a full state of the gauge with the lapse of time during which the user is present in the determination area.

In this way, the drawing mode is changed in accordance with the progress level of the action determination. Accordingly, the user can be fully informed of the progress level of the action determination. In addition, the user can be fully informed of a fact that the action determination starts.

In the above-described embodiment, the ECU 10 acquires the unoccupied state as the vehicle interior state, and determines the guidance destination of the user in accordance with the acquired unoccupied state. Without being limited thereto, for example, the state acquisition unit 12 may analyze an image captured by the in-vehicle camera 6. In this manner, as the vehicle interior state, the state acquisition unit 12 may acquire the position of the seat 2 where an object such as a person and a baggage is present on the seat surface. In this case, based on the acquired vehicle interior state, the irradiation control unit 13 may identify the seat 2 (that is, the unoccupied seat) where no object such as the person and the baggage is present on the seat surface, and may cause the irradiation device 7 corresponding to the identified seat 2 to draw the determination area.

In this way, the ECU 10 may acquire a status of the seat 2 as the vehicle interior state, and may determine the guidance destination of the user in accordance with the acquired status of the seat 2.

In addition, without being limited to the status of the seat 2, for example, the ECU 10 may determine the guidance destination of the user in accordance with a status of a cargo compartment disposed in the rear part of the vehicle 1. In this case, the state acquisition unit 12 analyzes an image captured by an in-vehicle camera (not illustrated) installed in the baggage compartment or the above-described in-vehicle camera 6. In this manner, as the vehicle interior state, the state acquisition unit 12 acquires information indicating whether an extra space is present or absent in the baggage compartment. In addition, the state acquisition unit 12 analyzes an image captured by a vehicle exterior camera (not illustrated) mounted on the vehicle 1 or the above-described vehicle exterior camera 5. In this manner, as the vehicle exterior state, the state acquisition unit 12 acquires information indicating whether any baggage possessed by the user is present or absent.

Then, in a case where the user possesses the baggage and the extra space is present in the baggage compartment, the irradiation control unit 13 determines the guidance destination corresponding to the baggage compartment as the guidance destination of the user, and causes the irradiation device 7 (for example, the irradiation device 7*e*) corresponding to the baggage compartment to draw the determination area. On the other hand, in a case where the user possesses the baggage and the extra space is not present in the baggage compartment, the irradiation control unit 13 causes the irradiation device 7 corresponding to the seat 2 where an object such as the person and the baggage is not present on the seat surface out of the plurality of seats 2 excluding the driver seat 2*a*, to draw the determination area. In this manner, the user can be guided to a location where the baggage is easily loaded.

In addition, in a case where the user gets on the vehicle with a child, the ECU 10 may guide the user to the guidance destination corresponding to the seat 2 where a child seat is installed.

In this case, the state acquisition unit 12 analyzes an image captured by the in-vehicle camera 6. In this manner, as the vehicle interior state, the state acquisition unit 12 acquires information indicating whether the child seat is present or absent and a position of the seat 2 where the child seat is installed in a case where the child seat is present.

In addition, in a case where the user determination unit 11 determines that the user is present around the vehicle 1, the state acquisition unit 12 performs face authentication or physical structure estimation by using an image captured by a vehicle exterior camera (not illustrated) mounted on the vehicle 1 or the above-described vehicle exterior camera 5. In this manner, as the vehicle exterior state, the state acquisition unit 12 acquires information indicating whether the child is present or absent around the user.

Then, in a case where the fact that the child is present around the user is acquired as the vehicle exterior state and the fact that child seat is present is acquired as the vehicle interior state, the irradiation control unit 13 causes the irradiation device 7 corresponding to the seat 2 where the child seat is installed, to draw the determination area. In this manner the user can be guided to the seat 2 where the child seat is installed.

In addition, in a case where the user possesses the baggage, the ECU 10 may guide the user to the guidance destination corresponding to the seat 2 in a fully flat state (state where a backrest is reclined) out of the plurality of seats 2 excluding the driver seat 2a. In this case, as the vehicle interior state, the state acquisition unit 12 acquires information indicating whether the seat 2 in the fully flat state is present or absent and the position of the seat 2 in a case where the seat 2 in the fully flat state is present. In addition, as the vehicle exterior state, the state acquisition unit 12 acquires information indicating whether the baggage possessed by the user is present or absent. Then, in a case where the user possesses the baggage, the irradiation control unit 13 causes the irradiation device 7 corresponding to the seat 2 in the fully flat state, to draw the determining area. In this manner, the user can be guided to a location where the baggage is easily loaded.

In addition, the ECU 10 may determine the guidance destination of the user in accordance with an action history of the user.

For example, as the action history of the user, the state acquisition unit 12 acquires a seating history of the user, that is, a seating history indicating the seat 2 on which the user sits in the past out of the plurality of seats 2, and associates the seating history with information for identifying the user (for example, the identification information of the external device or the biometric information of the user). In this manner, as the vehicle status information 17, the state acquisition unit 12 stores the associated information in a storage medium. Then, the irradiation control unit 13 may identify the seat 2 on which the user most frequently sits, based on the action history of the user, and may cause the irradiation device 7 corresponding to the identified seat 2 to irradiate the determination area with the light. In this manner, the user can be guided to the seat 2 on which the user frequently sits.

In addition, as the action history of the user, the state acquisition unit 12 may acquire the latest settlement history of the user. For example, the settlement history is directly acquired from the external device such as the smartphone possessed by the user or indirectly acquired via a settlement server. In this case, for example, the state acquisition unit 12 refers to the action history of the user within the most recent predetermined time (for example, 5 hours) and the settlement history after the user finally gets off the vehicle 1. In this manner, the state acquisition unit 12 determines whether the baggage possessed by the user is present or absent. For example, in a case where the settlement history is present within the above-described period, the state acquisition unit 12 determines that the user possesses the baggage. Then, in a case where it is determined that the user possesses the baggage, as described above, the irradiation control unit 13 may cause the irradiation device 7 corresponding to the seat 2 in the fully flat state or the unoccupied seat, to draw the determination area. In this manner, the user can be guided to a location where the baggage is easily loaded.

In addition, the state acquisition unit 12 may acquire position information of the user as the action history of the user. In this case, the state acquisition unit 12 acquires the position information from the external device such as the smartphone possessed by the user. Then, in a case where the location identified using the acquired position information is a commercial facility such as a department store or a shopping center, as illustrated above, the irradiation control unit 13 may cause the irradiation device 7 corresponding to the baggage compartment, the seat 2 in the fully flat state, or the unoccupied seat, to draw the determination area. In this manner, the user can be guided to a location where the baggage is easily loaded.

As described above, the vehicle control device (ECU 10) according to the embodiment includes the irradiation device 7, the action determination unit 14, and the vehicle control unit 15. The irradiation device 7 is disposed in the vehicle 1, and draws the determination area on the road surface by illuminating the road surface with the light. The action determination unit 14 determines the action of the user present in the determination area. The vehicle control unit 15 controls the vehicle, based on the action of the user which is determined by the action determination unit 14.

Therefore, according to the vehicle control device in the embodiment, the user can communicate the user's intention to the vehicle 1. In addition, the determination area is drawn on the road surface by using the light. Accordingly, the user is likely to intuitively recognize the location of the determination area. In addition, the action of the user is determined in the determination area drawn using the light. Accordingly, the action of the user can be accurately determined even in a case where the periphery of the vehicle 1 is dark. In addition, the user can easily carry out work in the dark. In addition, the determination area is drawn using the light. Accordingly, as an example, the user is likely to apparently recognize whether or not the vehicle 1 is in a controllable state.

In addition, the vehicle control device (ECU 10) according to the embodiment includes the state acquisition unit 12 and the irradiation control unit 13. The state acquisition unit 12 acquires a state of the vehicle 1. The irradiation control unit 13 controls the irradiation device 7 to perform the drawing mode of the determination area in accordance with the state of the vehicle 1 which is acquired by the state acquisition unit 12.

Therefore, according to the vehicle control device in the embodiment, the drawing mode of the determination area is controlled in accordance with the state of the vehicle 1. Accordingly, as an example, the user is likely to apparently recognize the content of the user's intention which can be currently received by the vehicle 1.

In addition, in the vehicle control device (ECU 10) according to the embodiment, the state acquisition unit 12 acquires an open/closed state of the electric door (doors 3c to 3e) mounted on the vehicle 1. In addition, in a case where the closed state of the electric door (doors 3c to 3e) is acquired by the state acquisition unit 12, the irradiation control unit 13 causes the irradiation device 7 to draw the determination area in the first drawing mode (determination area 131). In a case where the open state of the electric door (doors 3c to 3e) is acquired by the state acquisition unit 12, the irradiation control unit 13 causes the irradiation device 7 to draw the determination area in the second drawing mode (determination area 132). Then, in a case where the action of the user is determined in the determination area 131 drawn in the first drawing mode, the vehicle control unit 15 performs control to open the electric door (doors 3c to 3e). In a case where the action of the user is determined in the determination area 132 drawn in the second drawing mode, the vehicle control unit 15 performs control to close the electric door (doors 3c to 3e).

Therefore, according to the vehicle control device in the embodiment, the user is likely to apparently recognize whether the vehicle 1 is currently in a state of being capable of receiving the intention to open the doors 3c to 3e, or receiving the intention to close the doors 3c to 3e. In addition, in a case where the doors 3c to 3e are in a closed state, the vehicle 1 can open the doors 3c to 3e by receiving the intention to open the doors 3c to 3e from the user. In a case where the doors 3c to 3e are in an open state, the vehicle 1 can close the doors 3c to 3e by receiving the intention to close the doors 3c to 3e from the user.

In addition, in the vehicle control device (ECU 10) according to the embodiment, in a case where the irradiation control unit 13 performs control to open the electric door (doors 3c to 3e), the irradiation control unit 13 causes the irradiation device 7 to draw the determination area 133 in third drawing mode.

Therefore, according to the vehicle control device in the embodiment, as an example, the user can communicate the user's intention to stop the operation for opening the doors 3c to 3e to the vehicle 1.

In addition, in the vehicle control device (ECU 10) according to the embodiment, the irradiation control unit 13 causes the irradiation device 7 to draw the plurality of determination areas on the road surface. Then, in a case where the action of the user is determined in any determination area of the plurality of determining areas, the vehicle control unit 15 performs vehicle control corresponding to the determination area where the action of the user is determined.

Therefore, according to the vehicle control device in the embodiment, the user can be provided with the plurality of options relating to the vehicle control. Accordingly, the user can control the vehicle 1 by selecting desired vehicle control from the plurality of options. In addition, the determination area is drawn for each vehicle control item. Therefore, for example, the user can differently control the vehicle for the same action (action for entering the determination area and standing still).

In addition, in the vehicle control device (ECU 10) according to the embodiment, the irradiation control unit 13 adjusts the irradiation intensity of the irradiation device 7 in accordance with the brightness around the vehicle 1. Therefore, according to the vehicle control device in the embodiment, the action of the user can be determined using the irradiation intensity which does not cause the whiteout or the blackout to appear. Accordingly, the action of the user can be accurately determined.

In addition, in the vehicle control device (ECU 10) according to the embodiment, the state acquisition unit 12 acquires the information indicating whether the obstacle is present or absent in the region where the determination area is to be drawn. In a case where the obstacle is present in the region where the determination area is to be drawn, the irradiation control unit 13 causes the irradiation device 7 to draw the determination area in the drawing mode for avoiding the obstacle. Therefore, according to the vehicle control device in the embodiment, even under the environment where the obstacle such as the wall and the tree is present, the user can communicate the user's intention to the vehicle 1.

In addition, in the vehicle control device (ECU 10) according to the embodiment, the action determination unit 14 measures the time during which the user is present in the determination area, and the irradiation control unit 13 causes the irradiation device 7 to change the drawing mode in accordance with the time measured by the action determination unit 14. Therefore, according to the vehicle control device in the embodiment, the user can be fully informed of the progress level of the action determination. In addition, the user can be fully informed of the fact that the action determination starts.

In addition, as described above, the user guidance device (ECU 10) according to the embodiment is mounted on the vehicle 1, and includes the user determination unit 11, the state acquisition unit 12, and a guidance unit (the irradiation device 7 and the irradiation control unit 13). The user determination unit 11 determines whether or not the user of the vehicle 1 is present around the vehicle 1. The state acquisition unit 12 acquires the information indicating at least any one of the vehicle interior state and the vehicle exterior state in the vehicle 1. In a case where the user determination unit 11 determines that the user is present, the guidance unit guides the user by using the light, based on the information acquired by the state acquisition unit 12.

Therefore, according to the user guidance device in the embodiment, as a guidance target, it is possible to guide the user of the vehicle 1, for example, such as a person who is scheduled to get on the vehicle 1.

Pamphlet of International Publication No. WO2016/027315 discloses the following technique. A vehicle irradiates the road surface with the light to draw an animation character corresponding to an action (for example, moving back) to be performed by the vehicle from now on. In this manner, the vehicle intuitively communicates with a person outside the vehicle with regard to the action to be performed by the vehicle from now on. However, this technique targets the person other than the user of the vehicle, such as a passerby. Accordingly, the technique is different from the user guidance device according to the embodiment which targets the user of the vehicle. In addition, the technique disclosed in Pamphlet of International Publication No. WO2016/027315 is a technique for informing the user of danger by communicating a vehicle movement to the user in advance, and there is no viewpoint of "guidance". In addition, according to the technique disclosed in Pamphlet of International Publication No. WO2016/027315, the vehicle irradiates the road surface with the light to draw the animation character corresponding to the action to be performed by the vehicle from now on. The technique does not consider the vehicle interior state or the vehicle exterior state, unlike the user guidance device according to the embodiment.

In addition, in the user guidance device (ECU 10) according to the embodiment, as the vehicle exterior state, the state acquisition unit 12 acquires the position of the user determined to be present around the vehicle 1 by the user determination unit 11. The guidance unit (the irradiation device 7 and the irradiation control unit 13) determines the guidance destination of the user in accordance with the position of the user.

Therefore, according to the user guidance device in the embodiment, in a case where the plurality of options are present as the guidance destination, the user can be guided to a location close to the user.

In addition, in the user guidance device (ECU 10) according to the embodiment, the state acquisition unit 12 acquires the state of the road surface as the vehicle exterior state. The guidance unit (the irradiation device 7 and the irradiation control unit 13) determines the guidance destination of the user in accordance with the state of the road surface.

Therefore, according to the user guidance device in the embodiment, the guidance destination of the user is determined in accordance with the state of the road surface. Accordingly, as an example, the user can be guided to a location where the user is likely to get on the vehicle since the road surface has no puddle P or no other obstacles.

In addition, in the user guidance device (ECU 10) according to the embodiment, as the vehicle interior state, the state acquisition unit 12 acquires the status of the seat 2 installed in the vehicle interior, and the guidance unit (the irradiation device 7 and the irradiation control unit 13) determines the guidance destination of the user in accordance with the status of the seat 2. Therefore, according to the user guidance device in the embodiment, as an example, in a case where the user possesses the baggage, the user can be guided to a location where the baggage is easily loaded. In a case where the user gets on the vehicle with the child, the user can be guided to a location where the child seat is installed.

In addition, in the user guidance device (ECU 10) according to the embodiment, the state acquisition unit 12 acquires the unoccupied state, and the guidance unit (the irradiation device 7 and the irradiation control unit 13) determines the guidance destination of the user in accordance with the unoccupied state. Therefore, according to the user guidance device in the embodiment, the user is guided to the guidance destination corresponding to the unoccupied seat. Accordingly, as an example, the user can be guided to a location where the user is likely to get on the vehicle since no person or no baggage is present.

In addition, in the user guidance device (ECU 10) according to the embodiment, the state acquisition unit 12 acquires the action history of the user, and the guidance unit (the irradiation device 7 and the irradiation control unit 13) determines the guidance destination of the user in accordance with the action history acquired by the state acquisition unit 12. Therefore, according to the user guidance device in the embodiment, as an example, the user can be guided to the seat on which the user frequently sits.

In addition, in the user guidance device (ECU 10) according to the embodiment, the guidance unit includes the irradiation device 7 which irradiates the road surface with the light, and the irradiation control unit 13 which controls the irradiation device 7 to use the light irradiation mode, based on the information acquired by the state acquisition unit 12 and an irradiation control unit 13 for controlling the irradiation mode of light by irradiation device 7.

Therefore, according to the user guidance device in the embodiment, the irradiation control unit 13 controls the irradiation device 7, based on the information acquired by the state acquisition unit 12 so that the user can be guided using the light. In the above-described embodiment, for example, the following example has been described. In a case where the door 3 is in the closed state, the irradiation device 7 is caused to draw the determination area in which the letters of "OPEN" are written. In a case where the door 3 is in the open state, the irradiation device 7 is caused to draw the determination area in which the letters of "CLOSE" are written. That is, an example has been described in which the static mode drawn by the irradiation device 7 is changed based on the information acquired by the state acquisition unit 12. However, without being limited thereto, for example, the irradiation control unit 13 may cause the irradiation device 7 to draw the determination area by using the animation character. In this case, based on the information acquired by the state acquisition unit 12, a pattern of the animation character may be changed.

In the above-described embodiment, an example has been described in which the guidance destination of the user is the determination area. However, the guidance destination of the user is not necessarily the determination area. For example, in a case where the state acquisition unit 12 detects that the door 3e is in a half-open state, the irradiation control unit 13 may cause the irradiation device 7e to draw a drawing pattern indicating that the door 3e is in the half-open state, on the road surface. In this manner, the user can be guided to the door 3e in the half-open state.

In addition, in the above-described embodiment, a case has been described as an example in which the drawing patterns of the guidance patterns 141 and 142 are drawn on the road surface. However, the drawing pattern may be drawn in a location other than the road surface, for example, such as a body of the vehicle 1.

In addition, the irradiation device 7 does not necessarily need to draw the pattern. For example, the irradiation device 7 may be a lamp installed for each of the doors 3a to 3e.

In the above-described embodiment, a case has been described as an example in which only the doors 3c to 3e out of the plurality of doors 3 included in the vehicle 1 are the electric doors. Without being limited thereto, for example, the doors 3a and 3b may also be the electric doors such as power swing doors. That is, the electric door system 8 may include the actuator 8a for driving the doors 3a and 3b and the door sensor 8b for detecting the open/closed state of the doors 3a and 3b. The electric door lock system 9 may include the actuator 9a corresponding to the doors 3a and 3b and the lock sensor 9b for detecting the locked/unlocked state of the doors 3a and 3b. In addition, in this case, the vehicle 1 may include the vehicle exterior camera 5 and the irradiation device 7 corresponding to the doors 3a and 3b. In a case where the ECU 10 determines the driver seat 2a or the front passenger seat 2b as the guidance destination, the ECU 10 may cause the irradiation device 7 corresponding to the door 3a or the irradiation device 7 corresponding to the door 3b to draw the determination area.

In addition, in the above-described embodiment, a case has been described as an example in which the vehicle 1 includes the vehicle exterior camera 5c for imaging the right side of the vehicle 1, the vehicle exterior camera 5d for imaging the left side of the vehicle 1, and the vehicle exterior camera 5e for imaging the rear side of the vehicle 1. In addition to these cameras, for example, the vehicle 1 may further include a vehicle exterior camera for imaging the front side of the vehicle 1.

As an example, a vehicle control device according to an embodiment includes an irradiation device that is disposed in a vehicle, and that irradiates a road surface with light so as to draw a determination area on the road surface, an action determination unit that determines an action of a user existing in the determination area, and a vehicle control unit that controls the vehicle, based on the action of the user which is determined by the action determination unit. Therefore, according to the vehicle control device in the embodiment, as an example, the user can communicate an intention of the user to the vehicle. In addition, the determination area is drawn on the road surface by using the light. Accordingly, the user is likely to intuitively recognize a location of the determination area. In addition, the action of the user is determined in the determination area drawn using the light. Therefore, even in a case where a periphery of the vehicle is dark, it is possible to accurately determine the action of the user.

As an example, the above-described vehicle control device may further include a state acquisition unit that acquires a state of the vehicle, and an irradiation control unit that controls a drawing mode of the determination area to be drawn by the irradiation device, in accordance with the state of the vehicle which is acquired by the state acquisition unit. Therefore, according to the vehicle control device in the embodiment, the vehicle control device controls the drawing mode of the determination area in accordance with the state of the vehicle. Accordingly, as an example, the user is likely to apparently recognize content of the user's intention which can be received by the vehicle.

As an example, in the above-described vehicle control device, the state acquisition unit may acquire an open/closed state of an electric door mounted on the vehicle. In a case where a closed state of the electric door is acquired by the state acquisition unit, the irradiation control unit may cause the irradiation device to draw the determination area in a first drawing mode, and in a case where an open state of the electric door is acquired by the state acquisition unit, the irradiation control unit may cause the irradiation device to draw the determination area in a second drawing mode. In a case where the action of the user is determined in the determination area drawn in the first drawing mode, the vehicle control unit may control the vehicle to open the electric door, and in a case where the action of the user is determined in the determination area drawn in the second drawing mode, the vehicle control unit may control the vehicle to close the electric door. Therefore, as an example, according to the vehicle control device in the embodiment, the user is likely to apparently recognize whether the vehicle is currently in a state of being capable of receiving the user's intention to open the electric door or in a state of being capable of receiving the user's intention to close the electric door. In addition, in a case where the electric door is in a closed state, the vehicle can open the electric door by receiving the user's intention to open the electric door from the user. In a case where the electric door is in an open state, the vehicle can close the electric door by receiving the user's intention to close the electric door from the user.

As an example, in the above-described vehicle control device, in a case where the vehicle is controlled to open the electric door, the irradiation control unit may cause the irradiation device to draw the determination area in a third drawing mode. Therefore, as an example, according to the vehicle control device in the embodiment, the user can communicate the user's intention, for example, an intention to stop an opening operation of the electric door to the vehicle.

As an example, in the above-described vehicle control device, the irradiation control unit may cause the irradiation device to draw a plurality of the determination areas on the road surface. In a case where the action of the user is determined in any determination area out of the plurality of determination areas, the vehicle control unit may perform vehicle control corresponding to the determination area in which the action of the user is determined. Therefore, according to the vehicle control device in the embodiment, the user can be provided with a plurality of options relating to the vehicle control. Accordingly, the user can control the vehicle by selecting desired vehicle control from the plurality of options.

As an example, in the above-described vehicle control device, the irradiation control unit may adjust irradiation intensity of the irradiation device in accordance with brightness around the vehicle. Therefore, as an example, the action can be determined using the irradiation intensity which does not cause whiteout or blackout. Accordingly, the action of the user can be accurately determined.

As an example, in the above-described vehicle control device, the state acquisition unit may acquire whether an obstacle is present or absent in a region in which the determination area is to be drawn. In a case where the obstacle is present in the region in which the determination area is to be drawn, the irradiation control unit may cause the irradiation device to draw the determination area in a drawing mode for avoiding the obstacle. Therefore, as an example, even under an environment where the obstacle such as a wall and a tree is present, the user can communicate the user's intention to the vehicle.

As an example, in the above-described vehicle control device, the action determination unit may measure a time during which the user is present in the determination area. The irradiation control unit may change a drawing mode selected by the irradiation device in accordance with the time measured by the action determination unit. Therefore, as an example, the user can be informed of the progress level of the action determination. In addition, the user can be fully informed of a fact that the action determination starts.

As an example, in the above-described vehicle control device, the irradiation control unit may cause the irradiation device to draw the determination area in a drawing mode including letters.

As an example, in the above-described vehicle control device, the irradiation control unit may cause the irradiation device to draw the determination area in a drawing mode in which the letters are dynamically changed.

As an example, in the above-described vehicle control device, the irradiation control unit may cause the irradiation device to draw the determination area in a drawing mode including letters for indicating door opening/closing speed of the vehicle, as the letters.

As an example, in the above-described vehicle control device, the irradiation control unit may cause the irradiation device to draw the determination area in a drawing mode including letters for indicating door locking or unlocking of the vehicle, as the letters.

As an example, in the above-described vehicle control device, the irradiation control unit may cause the irradiation device to draw the determination area in a drawing mode corresponding to a progress level of the action determination while the action of the user is determined.

As an example, in the above-described vehicle control device, the irradiation control unit may change a color of the determination area, as the drawing mode corresponding to the progress level of the action determination.

As an example, in the above-described vehicle control device, the irradiation control unit may cause the determination area to blink, as the drawing mode corresponding to the progress level of the action determination.

As an example, in the above-described vehicle control device, the irradiation control unit may cause the determination area to blink more frequently with the lapse of time during which the user is present in the determination area.

As an example, in the above-described vehicle control device, the irradiation control unit may dynamically change an image, as the drawing mode corresponding to the progress level of the action determination.

Hitherto, the embodiment of this disclosure has been described as an example. However, the above-described embodiments and modification examples are merely examples, and do not intend to limit this disclosure. The above-described embodiment and modification examples can be implemented in various other forms. Various omissions, substitutions, combinations, and modifications can be made without departing from the gist of the embodiments disclosed here. In addition, configurations and shapes of each embodiment and each modification example can be partially replaced with each other.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle control device comprising:
an irradiation device that is disposed in a vehicle, and that irradiates a road surface with light so as to draw a determination area on the road surface;
an action determination unit that determines an action of a user existing in the determination area;
a vehicle control unit that controls the vehicle, based on the action of the user which is determined by the action determination unit;
a state acquisition unit that acquires a state of the vehicle; and
an irradiation control unit that controls a drawing mode of the determination area to be drawn by the irradiation device, in accordance with the state of the vehicle which is acquired by the state acquisition unit,
wherein the state acquisition unit acquires an open/closed state of an electric door mounted on the vehicle,
in a case where a closed state of the electric door is acquired by the state acquisition unit, the irradiation control unit causes the irradiation device to draw the determination area in a first drawing mode, and in a case where an open state of the electric door is acquired by the state acquisition unit, the irradiation control unit causes the irradiation device to draw the determination area in a second drawing mode, and
in a case where the action of the user is determined in the determination area drawn in the first drawing mode, the vehicle control unit controls the vehicle to open the electric door, and in a case where the action of the user is determined in the determination area drawn in the second drawing mode, the vehicle control unit controls the vehicle to close the electric door.

2. The vehicle control device according to claim 1, wherein in a case where the vehicle is controlled to open the electric door, the irradiation control unit causes the irradiation device to draw the determination area in a third drawing mode.

3. The vehicle control device according to claim 1, wherein the irradiation control unit causes the irradiation device to draw a plurality of the determination areas on the road surface, and
in a case where the action of the user is determined in any determination area out of the plurality of determination areas, the vehicle control unit performs vehicle control corresponding to the determination area in which the action of the user is determined.

4. The vehicle control device according to claim 1, wherein the irradiation control unit adjusts irradiation intensity of the irradiation device in accordance with brightness around the vehicle.

5. The vehicle control device according to claim 1, wherein the state acquisition unit acquires whether an obstacle is present or absent in a region in which the determination area is to be drawn, and
in a case where the obstacle is present in the region in which the determination area is to be drawn, the irradiation control unit causes the irradiation device to draw the determination area in the drawing mode for avoiding the obstacle.

6. The vehicle control device according to claim 1, wherein the action determination unit measures a time during which the user is present in the determination area, and
the irradiation control unit changes the drawing mode selected by the irradiation device in accordance with the time measured by the action determination unit.

7. The vehicle control device according to claim 1, wherein the irradiation control unit causes the irradiation device to draw the determination area in the drawing mode including letters.

8. The vehicle control device according to claim 7, wherein the irradiation control unit causes the irradiation device to draw the determination area in the drawing mode in which the letters are dynamically changed.

9. The vehicle control device according to claim 1, wherein the irradiation control unit causes the irradiation device to draw the determination area in the drawing mode including letters for indicating door locking or unlocking of the vehicle, as the letters.

10. The vehicle control device according to claim 1, wherein the irradiation control unit causes the irradiation device to draw the determination area in the drawing mode corresponding to a progress level of the action determination while the action of the user is determined.

11. The vehicle control device according to claim 10, wherein the irradiation control unit changes a color of the determination area, as the drawing mode corresponding to the progress level of the action determination.

12. The vehicle control device according to claim 10, wherein the irradiation control unit causes the determination area to blink, as the drawing mode corresponding to the progress level of the action determination.

13. The vehicle control device according to claim 12, wherein the irradiation control unit causes the determination area to blink more frequently with a lapse of time during which the user is present in the determination area.

14. The vehicle control device according to claim 10, wherein the irradiation control unit dynamically changes an image, as the drawing mode corresponding to the progress level of the action determination.

15. A vehicle control device comprising:
an irradiation device that is disposed in a vehicle, and that irradiates a road surface with light so as to draw a determination area on the road surface;
an action determination unit that determines an action of a user existing in the determination area;
a vehicle control unit that controls the vehicle, based on the action of the user which is determined by the action determination unit;
a state acquisition unit that acquires a state of the vehicle; and
an irradiation control unit that controls a drawing mode of the determination area to be drawn by the irradiation device, in accordance with the state of the vehicle which is acquired by the state acquisition unit,
wherein the irradiation control unit causes the irradiation device to draw the determination area in the drawing mode including letters, and
wherein the irradiation control unit causes the irradiation device to draw the determination area in the drawing mode including letters for indicating door opening/closing speed of the vehicle, as the letters.

* * * * *